United States Patent
Yang et al.

(10) Patent No.: US 9,625,637 B2
(45) Date of Patent: Apr. 18, 2017

(54) DIFFRACTIVE LIGHTING DEVICES WITH 3-DIMENSIONAL APPEARANCE

(75) Inventors: Zhaohui Yang, North Oaks, MN (US); David S. Thompson, West Lakeland, MN (US); Vivian W. Jones, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 13/572,805

(22) Filed: Aug. 13, 2012

(65) Prior Publication Data

US 2014/0043846 A1    Feb. 13, 2014

(51) Int. Cl.
*F21V 7/04* (2006.01)
*F21V 8/00* (2006.01)
(Continued)

(52) U.S. Cl.
CPC .......... *G02B 6/0035* (2013.01); *F21S 10/005* (2013.01); *F21S 8/03* (2013.01);
(Continued)

(58) Field of Classification Search
CPC .......... F21V 3/049; F21V 5/003; F21V 5/004; F21V 5/005; F21V 5/02; F21V 5/048;
(Continued)

(56) References Cited

U.S. PATENT DOCUMENTS

| 4,082,415 A | 4/1978 | Brooks |
| 4,550,973 A | 11/1985 | Hufnagel |
| (Continued) |

FOREIGN PATENT DOCUMENTS

| DE | 20 2008 001 960 U1 | 5/2008 |
| EP | 1351074 | 10/2003 |
| (Continued) |

OTHER PUBLICATIONS

PCT International Search Report for PCT/US2013/053890, mailed Nov. 27, 2013.
(Continued)

*Primary Examiner* — Laura Tso
*Assistant Examiner* — Naomi M Wolford

(57) ABSTRACT

Extended area lighting devices include a light guide and diffractive surface features on a major surface of the light guide. The diffractive surface features provide low distortion for viewing objects through the light guide. Light from discrete light source(s) is injected into the light guide, and the diffractive surface features interact with the injected light to couple guided-mode light out of the light guide. The out-coupled light produces one or more bands whose apparent shape changes with viewing position. The bands may be bright bands that correspond to the discrete light sources, or dark bands associated with an optional non-uniform reflective structure extending along a side surface of the light guide. Multiple bands may form a pattern that changes with viewing position, the pattern of bands having a 3-dimensional appearance for at least some viewing positions. The lighting devices can be used as luminaires for general lighting or decorative lighting.

16 Claims, 24 Drawing Sheets

(51) Int. Cl.
*F21S 10/00* (2006.01)
*F21S 8/00* (2006.01)
*F21S 8/04* (2006.01)
*F21W 121/00* (2006.01)
*F21S 8/06* (2006.01)
*F21S 8/08* (2006.01)
*F21Y 105/00* (2016.01)
*F21Y 101/00* (2016.01)
*F21Y 103/10* (2016.01)
*F21Y 115/10* (2016.01)
*F21Y 103/33* (2016.01)
*F21Y 113/13* (2016.01)

(52) U.S. Cl.
CPC .. *F21S 8/04* (2013.01); *F21S 8/06* (2013.01); *F21S 8/08* (2013.01); *F21W 2121/00* (2013.01); *F21Y 2101/00* (2013.01); *F21Y 2103/10* (2016.08); *F21Y 2103/33* (2016.08); *F21Y 2105/00* (2013.01); *F21Y 2113/13* (2016.08); *F21Y 2115/10* (2016.08); *G02B 6/006* (2013.01); *G02B 6/0063* (2013.01); *G02B 6/0068* (2013.01); *G02B 6/0076* (2013.01); *G02B 6/0078* (2013.01)

(58) Field of Classification Search
CPC ....... F21W 2121/00; F21W 3/049; F21S 8/03; F21S 8/04; G02B 6/0035; G02B 6/0068; G02B 6/0076; G02B 6/0078; G02B 6/006; G02B 6/063; F21Y 2101/02; F21Y 2113/005; F21Y 2103/022; F21Y 2103/003
USPC ........ 362/600–601, 615–617, 619–620, 628, 362/23.14, 511, 330, 603–613; 349/62, 349/65
See application file for complete search history.

(56) References Cited

U.S. PATENT DOCUMENTS

| | | | |
|---|---|---|---|
| 5,537,245 | A | 7/1996 | Migozzi |
| 5,543,228 | A | 8/1996 | Taniguchi |
| 5,703,667 | A | 12/1997 | Ochiai |
| 6,473,554 | B1 | 10/2002 | Pelka et al. |
| 6,773,126 | B1 | 8/2004 | Hatjasalo |
| 7,518,593 | B2* | 4/2009 | Daiku .......................... 345/102 |
| 7,798,699 | B2 | 9/2010 | Laitinen |
| 7,924,485 | B2* | 4/2011 | Park et al. ..................... 359/15 |
| 8,717,676 | B2 | 5/2014 | Rinko |
| 2004/0130879 | A1* | 7/2004 | Choi et al. ..................... 362/31 |
| 2004/0156182 | A1 | 8/2004 | Hatjasalo |
| 2005/0111814 | A9 | 5/2005 | Chen |
| 2005/0213348 | A1 | 9/2005 | Parikka |
| 2006/0279296 | A1 | 12/2006 | Lee |
| 2007/0076417 | A1 | 4/2007 | Yang |
| 2008/0037127 | A1 | 2/2008 | Weber |
| 2008/0184636 | A1 | 8/2008 | Fisher |
| 2009/0127849 | A1 | 5/2009 | Kim |
| 2009/0181484 | A1 | 7/2009 | Lee |
| 2010/0027293 | A1 | 2/2010 | Li |
| 2010/0073955 | A1* | 3/2010 | Cornelissen et al. ......... 362/554 |
| 2010/0079841 | A1 | 4/2010 | Levola |
| 2010/0122329 | A1 | 5/2010 | Jakobsson |
| 2010/0165660 | A1 | 7/2010 | Weber |
| 2010/0238686 | A1 | 9/2010 | Weber |
| 2010/0302802 | A1 | 12/2010 | Bita et al. |
| 2010/0321952 | A1 | 12/2010 | Coleman |
| 2011/0007524 | A1* | 1/2011 | Nagatani ...................... 362/616 |
| 2011/0127637 | A1 | 6/2011 | Chakravarti |
| 2011/0141395 | A1 | 6/2011 | Yashiro |
| 2011/0222295 | A1 | 9/2011 | Weber |
| 2011/0242837 | A1 | 10/2011 | Cornelissen |
| 2011/0274399 | A1 | 11/2011 | Ben Bakir |
| 2011/0279997 | A1 | 11/2011 | Weber |
| 2011/0310616 | A1* | 12/2011 | Carruthers ............... 362/296.05 |
| 2012/0033445 | A1* | 2/2012 | Desmet et al. ............... 362/606 |
| 2012/0057235 | A1 | 3/2012 | Chang |
| 2012/0069599 | A1 | 3/2012 | Cornelissen et al. |
| 2012/0098421 | A1 | 4/2012 | Thompson |
| 2012/0099323 | A1 | 4/2012 | Thompson |
| 2012/0106198 | A1* | 5/2012 | Lin et al. ...................... 362/609 |

FOREIGN PATENT DOCUMENTS

| | | |
|---|---|---|
| GB | 2340280 | 2/2000 |
| JP | 3045499 | 5/2005 |
| KR | 2009-0009443 | 9/2009 |
| WO | WO 2008-053078 | 5/2008 |
| WO | WO 2008-081071 | 7/2008 |
| WO | WO 2008-144644 | 11/2008 |
| WO | WO 2008-144656 | 11/2008 |
| WO | WO 2009-127849 | 10/2009 |
| WO | WO 2010-004187 | 1/2010 |
| WO | WO 2010-119426 | 10/2010 |
| WO | WO 2010-122329 | 10/2010 |
| WO | WO 2011-088161 | 7/2011 |
| WO | WO 2012-075352 | 6/2012 |
| WO | WO 2012-075384 | 6/2012 |
| WO | WO 2012/086894 | 6/2012 |

OTHER PUBLICATIONS

U.S. Appl. No. 13/572,813, Thompson, filed Aug. 13, 2012, for Lighting Devices with Patterned Printing of Diffractive Extraction Features.

U.S. Appl. No. 13/572,823, Yang, filed Aug. 13, 2012, for Colorful Diffractive Luminaires Providing White Light Illumination.

U.S. Appl. No. 13/572,835, Thompson, filed Aug. 13, 2012, for Diffractive Luminaires.

* cited by examiner

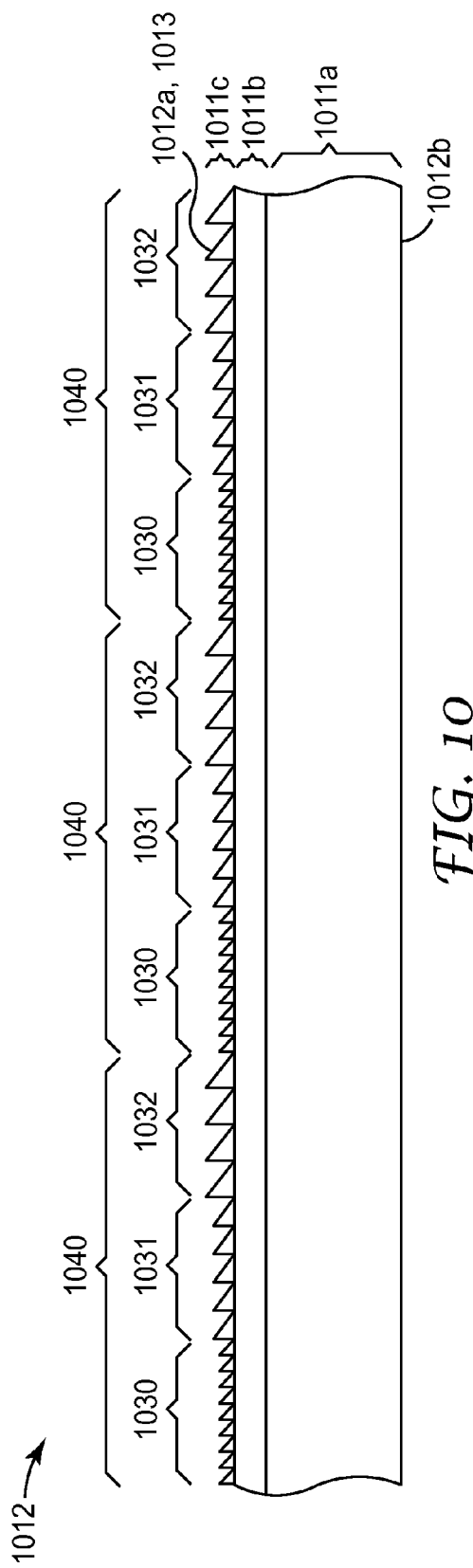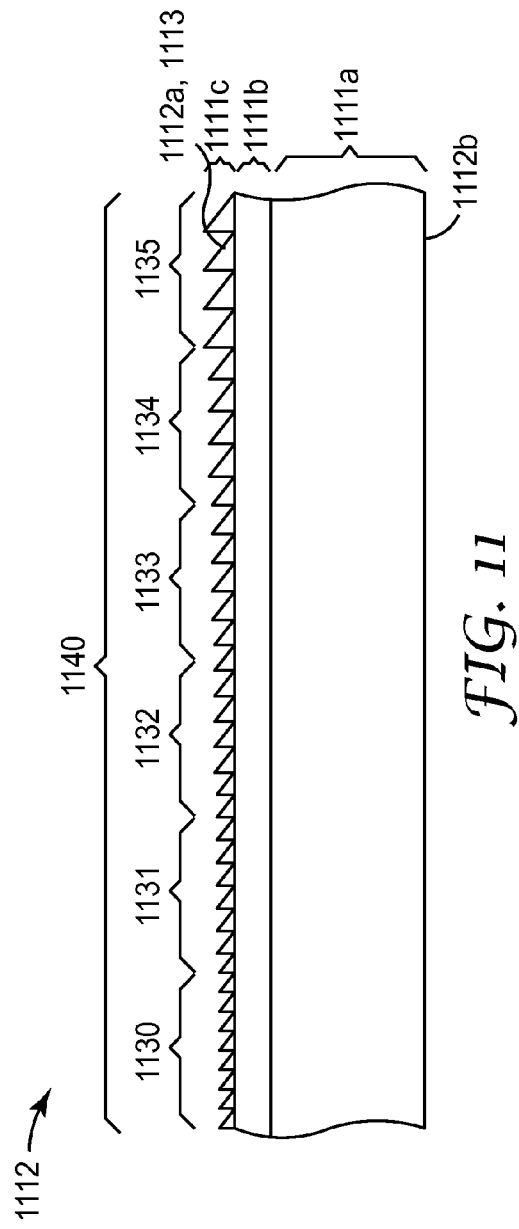
FIG. 10
FIG. 11

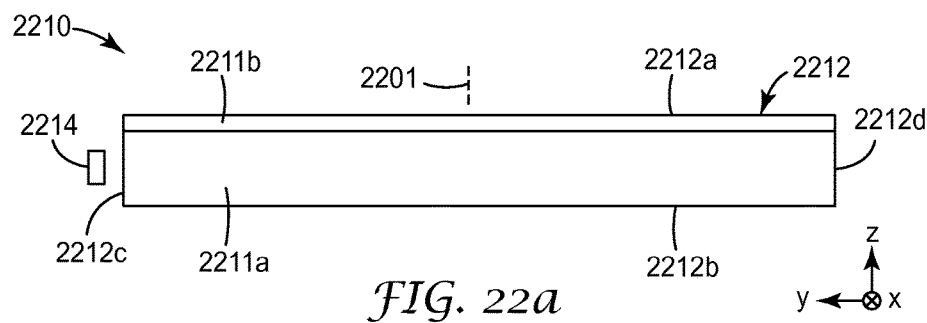
FIG. 22a
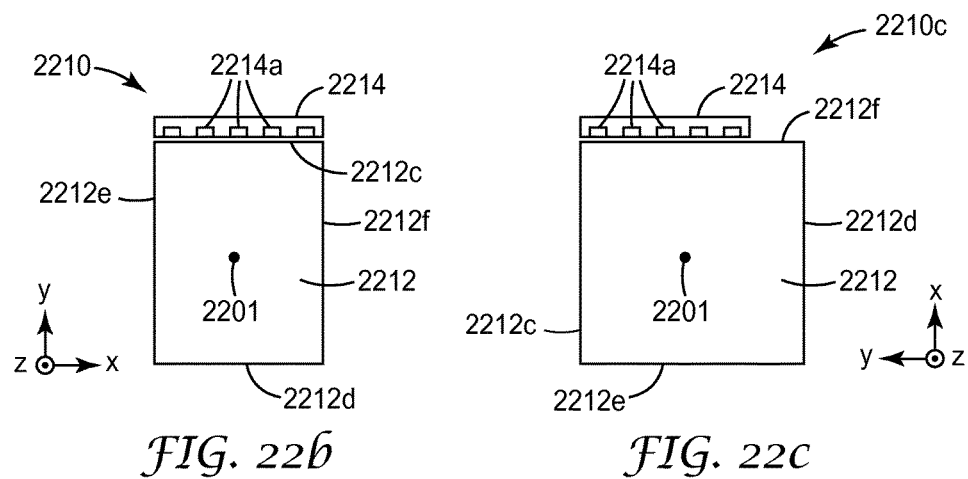
FIG. 22b
FIG. 22c

DIFFRACTIVE LIGHTING DEVICES WITH 3-DIMENSIONAL APPEARANCE

FIELD OF THE INVENTION

This invention relates generally to lighting devices, with particular application to lighting devices that incorporate a light guide and diffractive elements to couple guided-mode light out of the light guide. The invention also relates to associated articles, systems, and methods.

BACKGROUND

Extended area lighting devices that use a light guide to spread light from discrete edge-mounted CCFL or LED light sources over the extended area of the light guide are known. Edge-lit backlights used in liquid crystal displays (LCDs) are a major example of such lighting devices. Ordinarily, it is important for such lighting devices to have a color and brightness that are uniform, or at least slowly varying, as a function of position on the extended area output surface. It is also ordinarily important for such lighting devices to emit light of a substantially white color, so that the filtering action of the liquid crystal panel can produce full color pixels and pictures ranging from blue through red.

In order to extract guided-mode light out of the light guide, edge-lit backlights often configure a major surface of the light guide to have a printed pattern of diffusive paint or other scattering material, or to have a structured surface e.g. as provided by a series of grooves or prisms whose facets are designed to change the direction of light by refraction or reflection. It is not common to extract guided-mode light out of the light guide using diffractive grooves or prisms on the major surface, because diffraction has a strong wavelength dependence which could easily produce a highly colored appearance, and a highly colored appearance is unacceptable in most end-use applications.

BRIEF SUMMARY

We have developed a new family of extended area lighting devices that extract light from an extended light guide using diffractive surface features on a major surface of the light guide. Light from one or more discrete light sources is injected into the light guide, and the diffractive surface features interact with the injected light to couple guided-mode light out of the light guide. The out-coupled light produces one or more bands whose apparent shape changes with viewing position. The bands may be bright bands that correspond to the discrete light sources, or dark bands associated with an optional non-uniform reflective structure extending along a side surface of the light guide. Multiple bands may form a bright or dark pattern that changes with viewing position, the pattern of bands having a 3-dimensional appearance for at least some viewing positions. The lighting devices can be used as luminaires for general lighting or decorative lighting. The diffractive surface features used in these devices can provide low optical distortion for non-guided-mode light that propagates through the light guide, to permit viewing of objects through the light guide.

We describe herein, inter alia, lighting devices such as luminaires that include a light guide and a discrete light source. The light guide includes a first major surface, which has diffractive surface features adapted to couple guided-mode light out of the light guide. The discrete light source is disposed to inject light into the light guide. At least some of the diffractive surface features are non-straight in plan view, and the light source and the diffractive surface features are tailored to produce a band that intersects the non-straight diffractive surface features.

The band may be a bright band, and the band may change in appearance as a function of an observer's viewing position relative to the lighting device. The band may change from a straight shape at a first viewing position to a curved shape at a second viewing position. The discrete light source may be one of a plurality of light sources disposed to inject light into the light guide, and the band may be one of a plurality of bands corresponding to the plurality of light sources, each of the bands intersecting the non-straight diffractive surface features. The plurality of bands may form a pattern that changes as a function of an observer's viewing position relative to the lighting device, the pattern of bands having a 3-dimensional appearance for at least some of the viewing positions.

The light guide may have a non-polygonal shape and a side surface that is curved, in plan view. The discrete light source may be disposed to inject light into the light guide through the curved side surface. The discrete light source may be one of a plurality of light sources disposed to inject light into the light guide through the curved side surface, and the band may be one of a plurality of bands corresponding to the plurality of light sources, each of the bands intersecting the non-straight diffractive surface features. The non-straight diffractive surface features may define curved paths that are substantially non-intersecting and matched to the curved side surface. The non-polygonal shape may be circular or oval.

The non-straight diffractive surface features may define curved paths that form a spiral or a series of concentric circles or ovals. The light guide may exhibit low distortion for viewing objects through the light guide.

We also disclose lighting devices that include a light guide, a first light source, and non-uniform reflective structure. The light guide includes a first major surface and at least one side surface, the first major surface having diffractive surface features adapted to couple light out of the light guide. The first light source is disposed to inject light into the light guide. The non-uniform reflective structure extends along the at least one side surface, the non-uniform reflective structure providing a first reflectivity along a major portion of the at least one side surface and a second reflectivity, different from the first reflectivity, at a localized region of the at least one side surface. At least some of the diffractive surface features are non-straight in plan view, and the light source, the diffractive surface features, and the reflective structure are tailored to produce a band that intersects the non-straight diffractive surface features.

The first reflectivity may be at least 50% for visible light, and the second reflectivity may be less than the first reflectivity, such that the band is a dark band. The non-uniform reflective structure may include a reflective material disposed on the major portion of the at least one side surface, the reflective material being absent from the localized region of the at least one side surface. The non-uniform reflective structure may include a metal holder, and the second reflectivity at the localized region may correspond to a non-illuminated second light source carried by the metal holder. The light guide may have a non-polygonal shape in plan view, and the at least one side surface may be curved and extend around a complete perimeter of the light guide. The localized region may be one of a plurality of localized regions that are spaced-apart from each other and that have reflectivities less than the first reflectivity, and the band may be one of a plurality of dark bands corresponding to the plurality of localized regions, each of the dark bands intersecting the non-straight diffractive surface features. The plurality of dark bands may form a pattern that changes as a function of an observer's viewing position relative to the luminaire, the pattern of dark bands having a 3-dimensional appearance for at least some of the viewing positions.

We also disclose systems that include a first and second light guide and a first and second discrete light source. The first light guide includes a first major surface that has first diffractive surface features adapted to couple guided-mode light out of the first light guide. The second light guide includes a second major surface that has second diffractive surface features adapted to couple guided-mode light out of the second light guide. The first discrete light source is disposed to inject light into the first light guide, and the second discrete light source is disposed to inject light into the second light guide. At least some of the first diffractive surface features are non-straight in plan view, and the first light source and the first diffractive surface features are tailored to produce a first band that intersects the non-straight first diffractive surface features. Furthermore, at least some of the second diffractive surface features are non-straight in plan view, and the second light source and the second diffractive surface features are tailored to produce a second band that intersects the non-straight second diffractive surface features.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIGS. 10 and 11 are schematic side or sectional views of light guides with diffractive surface features, the diffractive surface features including groups of surface features of different pitches;

FIG. 15b is a schematic oblique view of the lighting device of FIG. 15a, where the device is viewed from an oblique angle, which produces a change in the shapes of the bands relative to their shape in FIG. 15a;

FIG. 19b is a photograph of the lighting device of FIG. 19a from the same oblique viewing angle, but with ambient light off and the discrete light sources of the lighting device turned on;

FIG. 20b is a graph of CIE chromaticity coordinates for selected spots as indicated in FIG. 20a;

FIG. 22a is a schematic side or sectional view of a lighting device made using one of the film pieces of FIG. 21;

FIG. 22b is a schematic front or plan view of the lighting device of FIG. 22a, where a linear group of discrete light sources is positioned along a minor edge of the light guide;

FIG. 22c is a schematic front or plan view similar to FIG. 22b, but where the linear group of discrete light sources is positioned along a major edge of the light guide.

In the figures, like reference numerals designate like elements.

DETAILED DESCRIPTION OF ILLUSTRATIVE EMBODIMENTS

We have found that lighting devices such as luminaries can be made using extended area light guides, diffractive surface features, and discrete light sources, to provide general purpose illumination in a device that can also be aesthetically pleasing due to a visual appearance that includes one or more bands having a 3-dimensional appearance, e.g. the bands may change shape as a function of viewing geometry (viewing position and/or viewing angle), and/or multiple bands may form a pattern having a 3-dimensional appearance for at least some viewing geometries. The change in shape is often associated with a change in curvature of one or more of the bands, e.g., changing from straight to curved or vice versa, or from gently curved to more strongly curved or vice versa.

Figure 1:
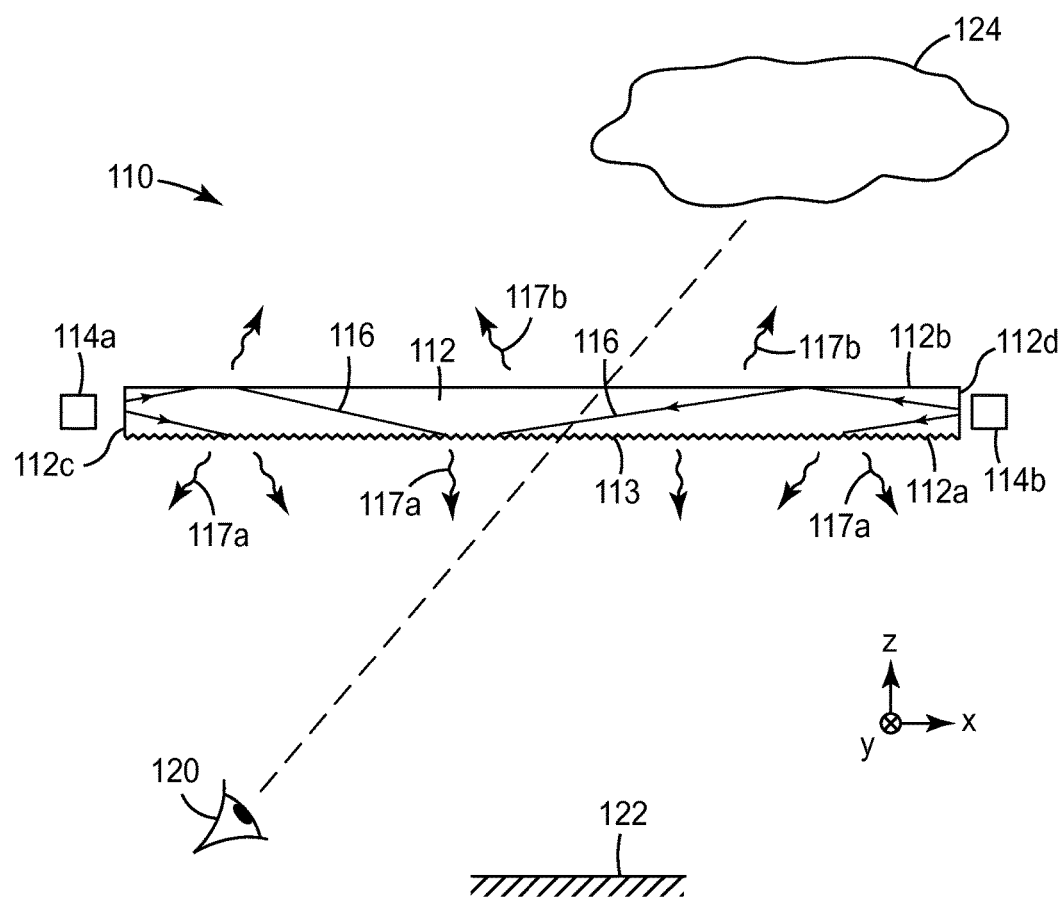
FIG. 1 is a schematic side or sectional view of a lighting device utilizing diffractive surface features on a major surface of a light guide.

An exemplary lighting device 110 is shown in schematic side or sectional view in FIG. 1. The lighting device 110 includes an extended area light guide 112 and discrete light sources 114a, 114b. The lighting device 110 may be mounted in any desired configuration but in this case it is shown mounted physically above the user 120, e.g. in or near a ceiling of a room or building. The device 110 may provide substantially white light illumination on a surface 122 such as a tabletop or floor. However, when the user 120 looks directly at the device 110, the user may see a pattern of colors across the emitting area of the device 110. The user also desirably sees one or more bands having a 3-dimensional appearance in the emitting area of the device. A given band is the result of the interaction of light emitted from one of the discrete light sources and diffractive surface features on one or both major surfaces of the light guide. Alternatively, a given band may be the result of the interaction of light reflected or absorbed by a localized region of high or low reflectivity in a non-uniform reflective structure extending along a side surface of the light guide. In addition to the pattern of colors and the bands in the emitting area of the device, the user 120 may also observe objects such as object 124 through the light guide 112 with little or no optical distortion. Light emitted by or reflected by such objects is able to propagate through the light guide as non-guided-mode light, only a small amount of which is deflected by the diffractive surface features.

The light guide 112 is extended along two in-plane directions, shown in FIG. 1 as an x- and y-axis of a Cartesian coordinate system, so that the light guide has opposed major surfaces 112a, 112b, as well as side surfaces 112c, 112d. Diffractive surface features 113 are provided on at least one of the major surfaces of the light guide 112, such as surface 112a as shown in the figure, or in other embodiments surface 112b, or both surfaces 112a and 112b. In any case, the diffractive surface features are tailored to couple guided-mode light out of the light guide by diffraction. The guided-mode light is shown in the figure as light 116, and out-coupled light emitted from the light guide is shown as light 117a, 117b. Light 117a passes through the surface 112a in the general direction of the user 120 or surface 122, and light 117b passes through the surface 112b in the general direction away from the user 120 or surface 122. In some cases the lighting device 110 may be mounted so that the light 117b provides indirect illumination to the room, e.g. by redirecting the light 117b back into the room by reflection from the ceiling or from another reflective member.

In this regard, a reflective film or layer may be applied to all or a portion of the surface 112b, or it may be positioned near the surface 112b, so as to redirect the light 117b so it emerges from the surface 112a. The reflective film may reflect light diffusely, specularly, or semi-specularly, and may reflect light uniformly or non-uniformly as a function of wavelength, and it may reflect normally incident light uniformly or non-uniformly as a function of polarization. The reflective film may for example be or comprise: white paint or paints of any other color; high reflectivity mirror films, e.g., films with metal coatings such as aluminum, silver, nickel, or the like, or non-metallic mirror films such as 3M™ Vikuiti™ ESR; multilayer optical films having organic (e.g. polymeric) or inorganic constituent optical layers with a layer thickness profile tailored to reflect light over some or all of the visible spectrum at normal incidence or at another desired incidence angle; ESR films with diffuse coatings; white reflectors having glossy surfaces; reflectors with brushed metal surfaces, including films with metal coatings whose surface is roughened to provide semi-specular or diffuse reflectivity; reflectors with structured surfaces; microcavitated PET films; 3M™ Light Enhancement Films; and/or reflective polarizing films, including but not limited to Vikuiti™ Diffuse Reflective Polarizer Film (DRPF), Vikuiti™ Dual Brightness Enhancement Film (DBEF), Vikuiti™ Dual Brightness Enhancement Film II (DBEF II), and multilayer optical films having different reflectivities for normally incident light of different polarizations but an average reflectivity of greater than 50% for such normally incident light, over some or all of the visible spectrum. See also the optical films disclosed in: US 2008/0037127 (Weber), "Wide Angle Mirror System"; US 2010/0165660 (Weber et al.), "Backlight and Display System Using Same"; US 2010/0238686 (Weber et al.), "Recycling Backlights With Semi-Specular Components"; US 2011/0222295 (Weber et al.), "Multilayer Optical Film with Output Confinement in Both Polar and Azimuthal Directions and Related Constructions"; US 2011/0279997 (Weber et al.), "Reflective Film Combinations with Output Confinement in Both Polar and Azimuthal Directions and Related Constructions"; WO 2008/144644 (Weber et al.), "Semi-Specular Components in Hollow Cavity Light Recycling Backlights"; and WO 2008/144656 (Weber et al.), "Light Recycling Hollow Cavity Type Display Backlight".

The light guide 112 may be physically thick or thin, but it is preferably thick enough to support a large number of guided modes and furthermore thick enough to efficiently couple to the emitting area of the discrete light sources. The light guide may, for example, have a physical thickness in a range from 0.2 to 20 mm, or from 2 to 10 mm. The thickness may be constant and uniform, or it may change as a function of position, as with a tapered or wedged light guide. If tapered, the light guide may be tapered in only one in-plane direction, e.g. either the x- or the y-axis, or it may be tapered in both principal in-plane directions.

The light guide may be substantially flat or planar, ignoring small amplitude surface variability associated with, e.g., diffractive surface structures. In some cases, however, the light guide may be non-flat, including simply curved, i.e., curved along only one principal in-plane direction, or complex curved, i.e., curved along both principal in-plane directions. The light guide may be entirely flat, entirely non-flat, or flat in some areas and non-flat in other areas. For light guides that are non-flat along a particular in-plane direction, the cross-sectional profile along such a direction may be, for example, a simple arc, or more complex non-straight contours. In some cases the light guide may deviate greatly from a flat structure, e.g., the light guide may be in the form of a solid or a hollow truncated hollow cone, wherein light injection can occur at the large end or the small end of the truncated cone, as desired.

Whether or not the light guide 112 is flat, the light guide may have an outer boundary or edge whose shape, when the light guide is seen in plan view, is curved, or piecewise flat (polygonal), or a combination of piecewise flat and curved. Examples of curved shapes are shapes with continuous arcs, such as circles, ovals, and ellipses, and shapes with discontinuous or undulating arcs, such as a sinusoid or sinusoid-like contour. Examples of piecewise flat shapes are triangles, quadrilaterals (e.g., squares, rectangles, rhombuses, parallelograms, trapezoids), pentagons, hexagons, octagons, and so forth. The piecewise flat shapes can provide a straight or flat side surface or edge for light injection from the discrete light sources, while curved shapes provide curved side surfaces for light injection.

The light guide is typically relatively rigid and self-supporting so that it does not substantially bend or deform under its own weight, but flexible light guides can also be used and may, if desired, be held in place using a support structure or frame, for example. The light guide may have a unitary construction, or it may be made from a plurality of components attached to each other with no significant intervening air gaps, e.g., a thin structured surface film attached to a flat, smooth major surface of a thicker plate using a clear optical adhesive.

The light guide may be made of any suitable low loss light-transmissive material(s), such as glasses, plastics, or combinations thereof. Materials that are low loss, e.g., low absorption and low scattering over visible wavelengths, are desirable so that guided-mode light can propagate from one side surface completely across the light guide with absorption/scattering losses that are small compared to losses due to out-coupling of such light by the diffractive surface features. Exemplary materials include suitable: glasses; acrylics; polycarbonates; polyurethanes; cyclo-olefin polymer/copolymers, including Zeonex™ and Zeonor™ materials sold by Zeon Chemicals L.P, Louisville, Ky.; silicones and elastomers; and pressure sensitive adhesives (PSAs) and other adhesives, including silicone adhesives, 3M™ VHB™ conformable acrylic foam tapes, and 3M™ OCA™ optically clear adhesives.

The device 110 also includes one or more discrete light sources 114a, 114b, which are preferably mounted at an edge or side surface of the light guide 112. The sources are preferably discrete and small in size relative to the in-plane dimension (length or width) of the light guide. The sources 114a, 114b are preferably solid state light sources such as light emitting diodes (LEDs), but other suitable light sources can also be used.

In this regard, "light emitting diode" or "LED" refers to a diode that emits light, whether visible, ultraviolet, or infrared, although in most practical embodiments the emitted light will have a peak wavelength in the visible spectrum, e.g. from about 400 to 700 nm. The term LED includes incoherent encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. For example, the LED die may be formed from a combination of one or more Group III elements and of one or more Group V elements (III-V semiconductor). The component or chip can include electrical contacts suitable for application of power to energize the device. Examples include wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. Some packaged LEDs are made by forming a polymer encapsulant over an LED die and an associated reflector cup. Some packaged LEDs also include one or more phosphor materials that are excited by an ultraviolet or short wavelength visible LED die, and fluoresce at one or more wavelengths in the visible spectrum. An "LED" for purposes of this application should also be considered to include organic light emitting diodes, commonly referred to as OLEDs.

Light emitted by the sources such as sources 114a, 114b is injected into the light guide to provide guided-mode light, i.e., light that is predominantly trapped in the light guide by total internal reflection (TIR), ignoring the effect of any diffractive surface features. The light emitted by each individual source is visible, and may be broad band (e.g. white) or narrow band (e.g. colored such as red, yellow, green, blue). If colored narrow band sources are used, different colors can be combined to provide an overall white light illumination on the surface 122, or the colors can be uniform, or different from each other but combined in such a way as to provide a decorative colored (non-white) illumination on the surface 122.

Diffractive surface features 113 are provided on at least one major surface of the light guide. These surface features or structures may be exposed to air, or planarized with a tangible material such as a low refractive index material, or both (some exposed to air, some planarized) in a patterned arrangement. As discussed elsewhere herein, the diffractive surface features are sized and otherwise configured to couple guided-mode light out of the light guide by diffraction, such that different wavelengths are coupled out differently, e.g. in different amounts, different directions, and different angular distributions. The diffractive surface features may be tailored so that light from the edge-mounted light sources is emitted substantially equally from both major surfaces 112a, 112b of the light guide, or instead so that the light is preferentially emitted from one of the major surfaces, such as surface 112a, which may then be designated the output surface of the light guide. In the latter case, the device may be mounted in a specific orientation so as to efficiently illuminate a room, workspace, or other surface.

Although the diffractive surface features couple guided-mode light out of the light guide, the light guide and the diffractive surface features are preferably tailored so that non-guided-mode light, e.g., light originating from a source or object behind the light guide and incident on one of the major surfaces of the light guide, is minimally deviated (whether by diffraction or refraction) such that objects can be viewed through the light guide with low distortion. The low distortion may provide both aesthetic and utilitarian benefits. In FIG. 1, the distortion is low enough so that the user 120 can view and recognize the object 124 through the light guide 112. The object 124 may be the ceiling or another neighboring structure which neither generates light nor is part of the lighting device 110. Alternatively, the object 124 may generate light and may be a part of the lighting device 110, for example, it may be another edge-lit light guide with its own diffractive surface features, or it may be a more conventional light source such as a spotlight or light bulb with no diffractive surface features but connected to the light guide 112 and mounted such that most or at least some of the light it emits is directed through the light guide 112. Furthermore, the object 124 may be or include a graphic film disposed near or attached to the device 110.

The diffractive surface features 113 may be present over substantially all of the major surface 112a, or only a portion of the surface. If the diffractive surface features cover only certain portions of the surface, light from the edge-mounted light sources may be emitted from the light guide only in those portions.

Additional aspects of the diffractive surface features are discussed further below. One particularly noteworthy feature is that at least some of the diffractive surface features are non-straight in plan view, and light propagating within the light guide interacts with the diffractive surface features to produce at least one band that intersects the non-straight diffractive surface features. The band may be a bright band, or, in some cases, a dark band. The band changes in appearance (e.g. shape) as a function of the viewing position of an observer 120 relative to the lighting device 110. The band may be a member of a group of bands that form a pattern, and the band or bands may provide a 3-dimensional appearance as a result of their appearance at a given viewing position, and/or as a result of their change in appearance from one viewing position to another. Each band in the group of bands may intersect the non-straight diffractive surface features at one or more given viewing positions. The non-straight diffractive features may be, for example, curved or segmented in shape, or may have an undulating or disjointed shape comprising curves and/or segments.

The lighting device 110, and the other lighting devices disclosed herein, can be used as a luminaire or similar lighting device for general illumination purposes or the like. The luminaire may be mounted in any desired position and orientation, e.g., on, within, or near a ceiling of a room, or on, within, or near a wall of a room, or mounted on a post, stand, or other support structure. The luminaire may be oriented parallel to the ceiling, or parallel to the wall, or at an oblique or intermediate angle with respect to the ceiling or wall.

Figure 2:
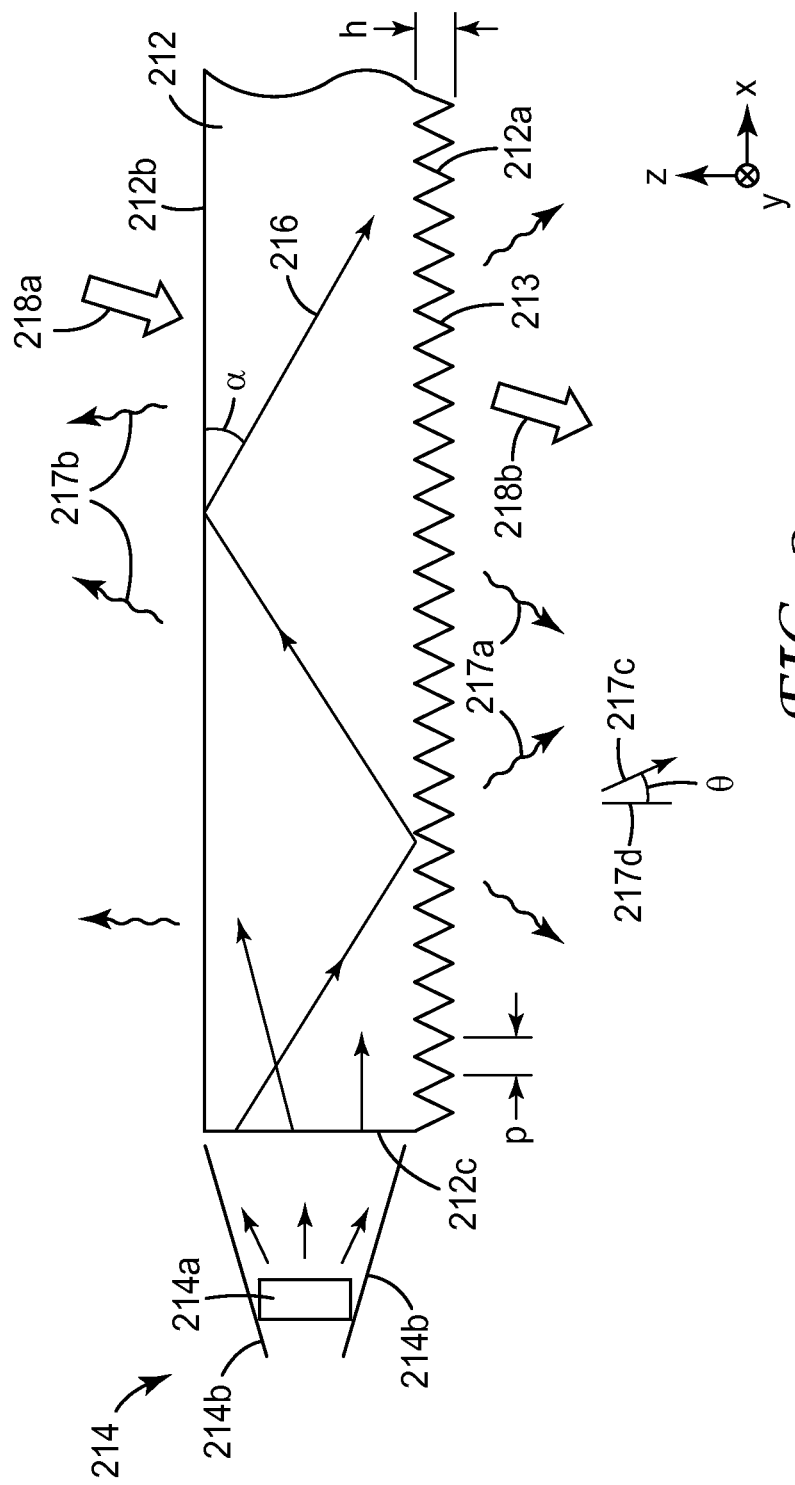
FIG. 2 is a schematic side or sectional view of a light guide with a discrete light source injecting light into the light guide and diffractive surface features coupling guided-mode light out of the light guide.

In FIG. 2, we see a schematic view of a light guide 212 with a discrete light source 214 injecting light into the light guide, and diffractive surface features 213 coupling guided-mode light 216 out of the light guide to provide out-coupled light 217a, 217b. The light guide 212, which may be the same as or similar to the light guide 112 discussed above, has a first major surface 212a on which the diffractive surface features 213 are provided, a second major surface 212b opposite the first major surface, and a side surface 212c through which light from the light source 214 can enter the light guide. The light source 214 may include an active element 214a such as one or more LED dies which convert electricity into visible light, and one or more reflective members 214b which help direct some of the misdirected light from the element 214a into the side surface 212c of the light guide 212. Guided-mode light 216 from the light source 214 propagates via total internal reflection (TIR) along and within the light guide 212 over a range of angles α which may be measured relative to the local plane of the light guide, in this case, the x-y plane. Out-coupled light 217a, 217b may be measured or characterized, at least in part, by the polar angle θ between the direction of propagation of a given light ray 217c and an axis 217d normal to the local plane of the light guide, in this case, the z-axis. FIG. 2 also shows an incident light beam 218a impinging upon and entering the light guide 212 through the major surface 212b, propagating through the light guide 212 as non-guided-mode light, and exiting the light guide through the major surface 212a as transmitted light beam 218b. The transmitted beam 218b is preferably minimally deviated by the diffractive surface features 213 such that objects can be viewed through the light guide 212 with low distortion.

We will now elaborate on relevant design characteristics of the diffractive surface features 213 that allow them to provide the functional properties discussed above. Typically, the diffractive surface features 213 are grooves or ridges/prisms with well-defined faces that follow predetermined paths in plan view. For purposes of FIG. 2, we will assume for simplicity that the diffractive features 213 follow straight, linear paths that are parallel to each other and to the y-axis. This assumption is not as restrictive as it seems, because the straight, linear features can approximate a very small portion or section of diffractive surface features that follow curved paths in plan view, such as concentric circles or spiral arcs. We also assume for simplicity that the diffractive features 213 have a uniform center-to-center spacing known as "pitch", which is labeled "p" in FIG. 2. This assumption is also not as restrictive as it seems, because the uniformly spaced diffractive features 213 can approximate a very small portion or section of diffractive surface features whose pitch p changes as a function of position. The diffractive surface features 213 are also assumed to have a depth (grooves) or height (prisms) "h" as shown in FIG. 2.

The diffractive surface features 213 with the assumed linear configuration and constant pitch can be referred to as a single-pitch (or periodic) one-dimensional (1D) diffraction grating. The single-pitch 1D grating is directly coupled to, and forms the major surface 212a of, the light guide 212, which we assume has a refractive index of n and is immersed in air or vacuum. Light from the light source 214 of optical wavelength λ is injected or launched into the light guide 212 through the side surface 212c, and propagates primarily by TIR within and along the light guide as guided-mode light 216. When such light impinges upon and interacts with the diffractive surface features 213, a fraction (η) of the guided-mode light 216 is extracted as out-coupled light 217a, 217b. The out-coupled or extracted light 217a, 217b propagates along a direction that is orthogonal to the light guide surface (e.g. having a polar angle θ=0 in FIG. 2) when the following condition is met:

$$m \times (\lambda/n) = d \times \cos(\alpha). \quad (1)$$

In this equation: α refers to the angle at which the guided-mode light impinges on the grating surface, measured relative to the plane of the surface substantially as shown in FIG. 2; m is the diffraction order; n is the refractive index of the light guide 212; λ is the wavelength of light; and d is the grating pitch, which is labeled "p" in FIG. 2. For example, for green light with λ=530 nm launched on-axis (α=0 degrees) into an acrylic light guide having a refractive index n=1.5, the grating pitch d (or p) should equal 353 nm, and only the first diffraction order (m=1) is possible. For other values of α and λ, the extraction direction will in general no longer be orthogonal to the light guide surface.

A computer simulation can be used here to illustrate the angular distribution characteristics of extracted or out-coupled light as a function of the light source wavelength, for the single-pitch 1D diffraction grating. In order to fully characterize the angular distribution, both polar angle (angle θ in FIG. 2) and azimuthal angle (the angle measured in the x-y plane relative to a fixed direction or axis in the x-y plane) should be considered. For purposes of the simulation, for simplicity, we assume: that the light source 214 and the light guide 212 (including the diffractive surface features 213) extend infinitely along axes parallel to the y-axis; that the pitch d (or p) is 353 nm; and that the light source 214 has a Lambertian distribution in the x-z plane, i.e., an intensity proportional to the cosine of α, for light emitted by the light source 214 in air before impinging on the side surface 212c. After running the simulation with these assumptions, we calculate the total integrated optical power density as a function of the polar angle θ for 3 different optical wavelengths λ, and plot the results in FIG. 3. In that figure, curves 310, 312, 314 show the integrated optical power density for the optical wavelengths λ of 450 nm (blue light), 530 nm (green light), and 620 nm (red light), respectively.

Figure 3:
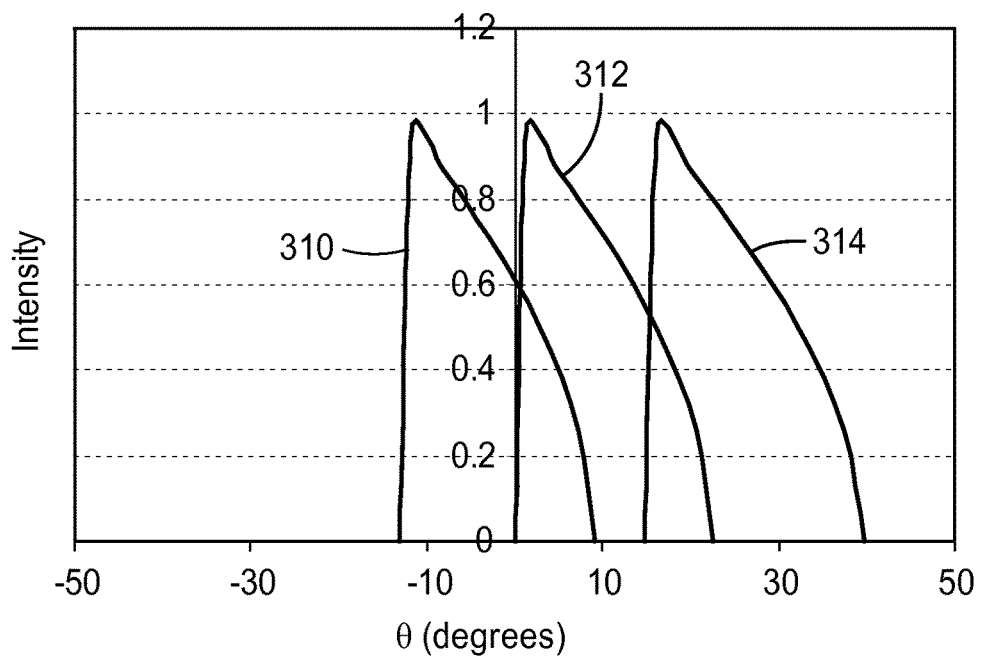
FIG. 3 is a graph of intensity versus polar angle of integrated optical power density for light extracted from a light guide using linear diffractive surface features.

The simulated results of FIG. 3 demonstrate, among other things, the wavelength-dependent nature of light extraction using diffractive surface features. Although the curves 310, 312, 314 overlap to some extent, their peak intensities occur at polar angles that differ from each other by more than 10 degrees, with the red and blue peaks being separated by almost 30 degrees.

In addition to the simulation, we also fabricated a single-pitch 1D diffraction grating to demonstrate its utility as a light extractor for a light guide. First, a diamond tip for a diamond turning machine (DTM) was shaped using a focused ion beam (FIB) to form a V-shaped diamond tip with an included angle of 45 degrees. This diamond tip was then used to cut symmetric, equally spaced V-shaped grooves around the circumference of a copper roll to make a diffraction grating master tool. A cast-and-cure replication process was then used to transfer the grating pattern from the master tool to a film substrate. A triacetate cellulose (TAC) film having a thickness of 3 mils (about 76 micrometers) was used as a base film or substrate due to its low birefringence and its refractive index value (n=1.5), which matches well to the refractive index of typical light guide materials. This base film was applied to the master tool with a thin acrylate resin coating therebetween. The acrylate resin composition comprised acrylate monomers (75% by weight PHOTOMER 6210 available from Cognis and 25% by weight 1,6-hexanedioldiacrylate available from Aldrich Chemical Co.) and a photoinitiator (1% by weight Darocur 1173, Ciba Specialty Chemicals). Ultraviolet light from a mercury vapor lamp ("D" bulb) was used for both casting and post-curing the microreplicated resin on the base film. The casting roll temperature was set at 130 degrees F. (54 degrees C.), and the nip pressure was set at 20 to 25 psi (about 138,000 to 172,000 pascals).

Figure 4:
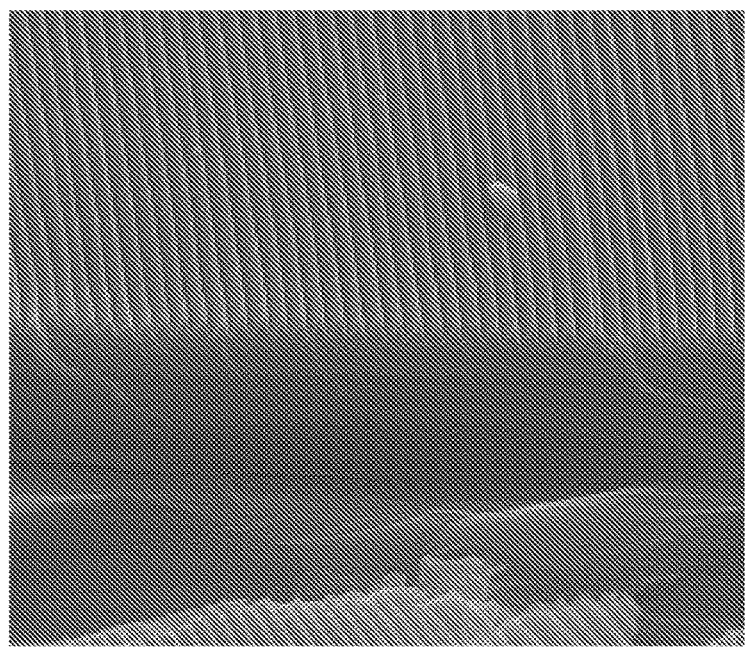
FIG. 4 is a micrograph of a replicated diffractive surface useful for light extraction from a light guide.

A microphotograph of the structured or grooved surface of the resulting diffraction grating film is shown in FIG. 4. The pitch of the diffractive surface features in this figure is about 400 nanometers, and the depth of the grooves (or height of the prisms) is about 500 nanometers.

This film was then laminated to a 2 mm thick acrylic plate, which was clear, flat, and rectangular, using a layer of optically clear adhesive (3M™ Optically Clear Adhesive 8172 from 3M Company, St. Paul, Minn.) such that the diffraction grating faced away from the acrylic plate and was exposed to air, and such that no significant air gaps were present between the base film of the diffraction grating film and the flat major surface of the acrylic plate to which the film was adhered. The laminated construction thus formed a light guide having the single-pitch 1D diffraction grating serving as diffractive surface features on one major surface of the light guide. The light guide included a flat, straight side surface extending parallel to the groove direction of the diffractive surface features, similar to the configuration of FIG. 2. A light source was constructed using a linear array of orange-emitting LEDs (obtained from OSRAM Opto Semiconductors GmbH), each LED having a center wavelength of about 590 nm and a full-width-at-half-maximum (FWHM) bandwidth of about 20 nm. The discrete character of the individual LEDs was masked by placing a diffuser plate (type DR-50 from Astra Products Inc., Baldwin, N.Y.) in front of the LEDs, i.e., between the LEDs and the side surface of the light guide, to provide illumination that was more spatially uniform. The light source thus approximated a linear light source emitting light that was approximately monochromatic at a wavelength of 590 nm.

Figure 5:
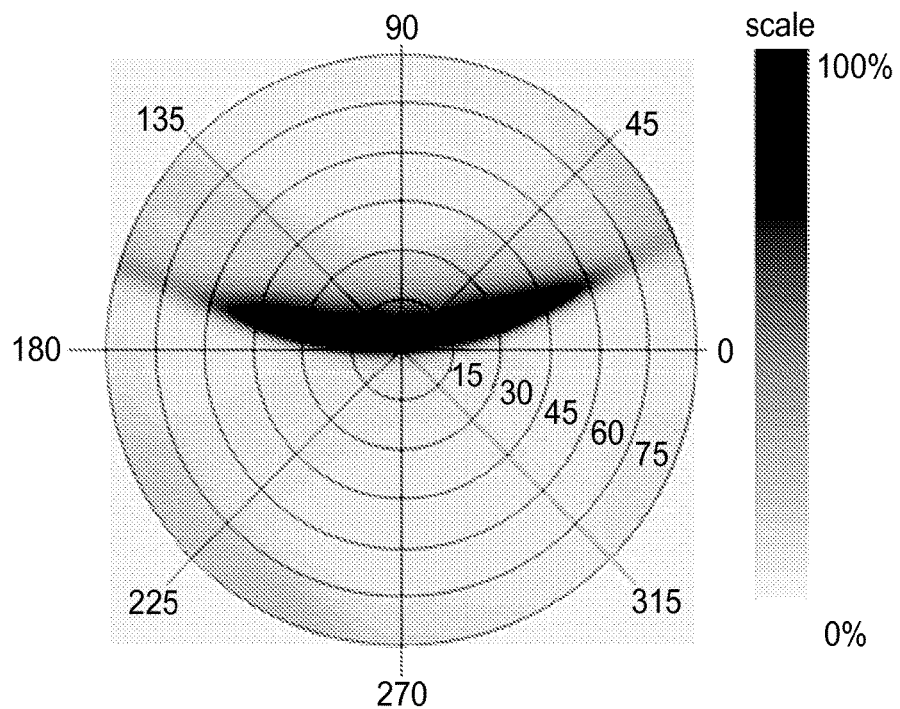
FIG. 5 is a conoscopic plot of measured intensity as a function of polar and azimuthal angle for a lighting device that used diffractive surface structures as shown in FIG. 4.

The light source was energized, and the intensity of the out-coupled light emitted through the diffractive surface features was measured as a function of polar angle and azimuthal angle using a conoscopic camera system. The measured conoscopic intensity distribution is shown in FIG. 5. In this figure, the direction of elongation of the light source, and the groove direction, corresponds to azimuthal values of 0 and 180 degrees. The measured intensity or luminance in an orthogonal reference plane, i.e., in a plane corresponding to azimuthal values of 90 and 270 degrees in FIG. 5, is plotted as a function of polar angle θ in FIG. 5a. The reader may note the similarity of the curve in FIG. 5a relative to the shape of the curves 310, 312, 314 in FIG. 3. The reader may also note in reference to FIG. 5 that light is extracted by the 1D diffraction grating in a narrow crescent-shaped distribution that does not lie in a plane, but that shifts in azimuthal angle as a function of polar angle.

Other aspects of the extended area lighting device discussed in connection with FIGS. 4, 5, and 5a include: light is extracted or out-coupled equally from both major surfaces of the light guide (see e.g. surfaces 212a, 212b of FIG. 2), which is a result of the symmetric design of the diffractive surface features (i.e., the symmetric V-shaped grooves that form the linear diffraction grating); if the monochromatic source is replaced with a white light source and/or multi-colored light sources, angular color separation will occur as a result of the diffraction phenomenon (see e.g. FIG. 3); no diffuser component is needed in the device (although in the embodiment of FIGS. 5 and 5a one is included in the light source to mask the discrete nature of the LED light sources)

due to the fact that TIR is relied upon to allow the guided-mode light to propagate along the waveguide, and diffraction is relied upon to extract or out-couple the light from the light guide; and the crescent-shaped distribution of out-coupled light is characterized by a relatively narrow light extraction angle.

Figure 6:
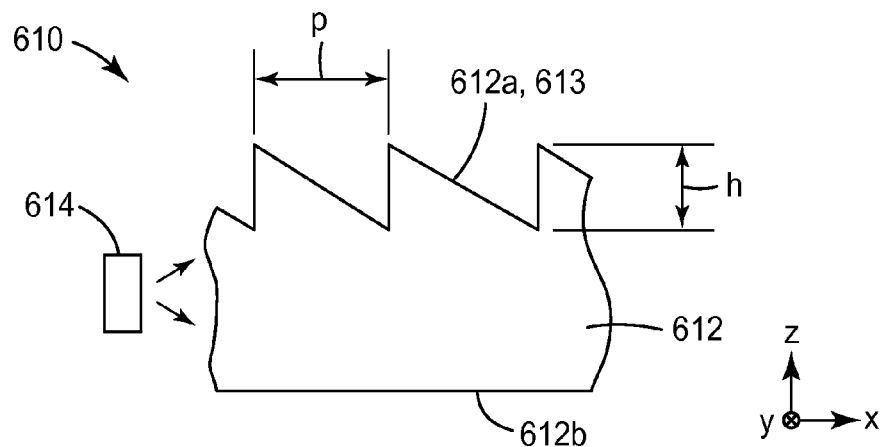
FIG. 6 is a schematic side or sectional view of a light guide having asymmetric or blazed diffractive surface structures.

Guided-mode light may be extracted or out-coupled preferentially through one major surface of the light guide rather than the other major surface by changing the shape of the diffractive surface features, in particular, making the shape of the individual features (e.g. prisms) asymmetrical. We demonstrate this in connection with FIGS. 6 and 7. In FIG. 6, a lighting device 610 includes a light guide 612 having a first major surface 612a and an opposed second major surface 612b. The first major surface 612a comprises diffractive surface features 613 in the form of facets which form right-angle prism structures of height "h" and pitch "p". The device 610 also includes a light source 614 disposed proximate a side surface of the light guide 612 to inject light into the light guide as guided-mode light, such light propagating generally from left to right from the perspective of FIG. 6. A computer simulation of the device 610 was performed. In the simulation, for simplicity, the prism structures of the diffractive surface features 613 were assumed to be equally spaced, and extending linearly along axes parallel to the y-axis. The light source was also assumed to extend linearly parallel to the y-axis, and was assumed to emit polarized light of wavelength λ into air in a Lambertian distribution in a first reference plane parallel to the plane of the light guide (see the x-y plane in FIG. 2), this light then being refracted at the side surface of the light guide. The simulation assumed only one propagation angle of light, α=5 degrees as referenced in FIG. 2, in a second reference plane (see the x-z plane in FIG. 2) perpendicular to the first reference plane. The refractive index of the light guide was assumed to be 1.5. The optical wavelength λ and the grating pitch p were initially selected such that the out-coupled light was extracted orthogonal to the light guide surface for first order diffraction (m=1), which yielded λ≈520 nm and p≈350 nm. The grating height h was then varied over a range from 50 to 500 nm, while the pitch p was held constant at 350 nm. For each embodiment associated with a specific value for the grating height, the following quantities were calculated by the computer simulation software:

extraction efficiency for transverse magnetic (TM) polarized light extracted from the first major surface 612a, referred to here as TM-top extraction efficiency;

extraction efficiency for transverse electric (TE) polarized light extracted from the first major surface 612a, referred to here as TE-top extraction efficiency;

extraction efficiency for transverse magnetic (TM) polarized light extracted from the second major surface 612b, referred to here as TM-bottom extraction efficiency; and extraction efficiency for transverse electric (TE) polarized light extracted from the second major surface 612b, referred to here as TE-bottom extraction efficiency.

In this regard, "extraction efficiency" refers to the amount (expressed as a percentage) of specified light (TM or TE) extracted from the specified major surface (612a or 612b) for a single interaction, divided by the amount of such specified light propagating within the light guide immediately before the interaction of the light beam with the extraction surface.

Figure 7:
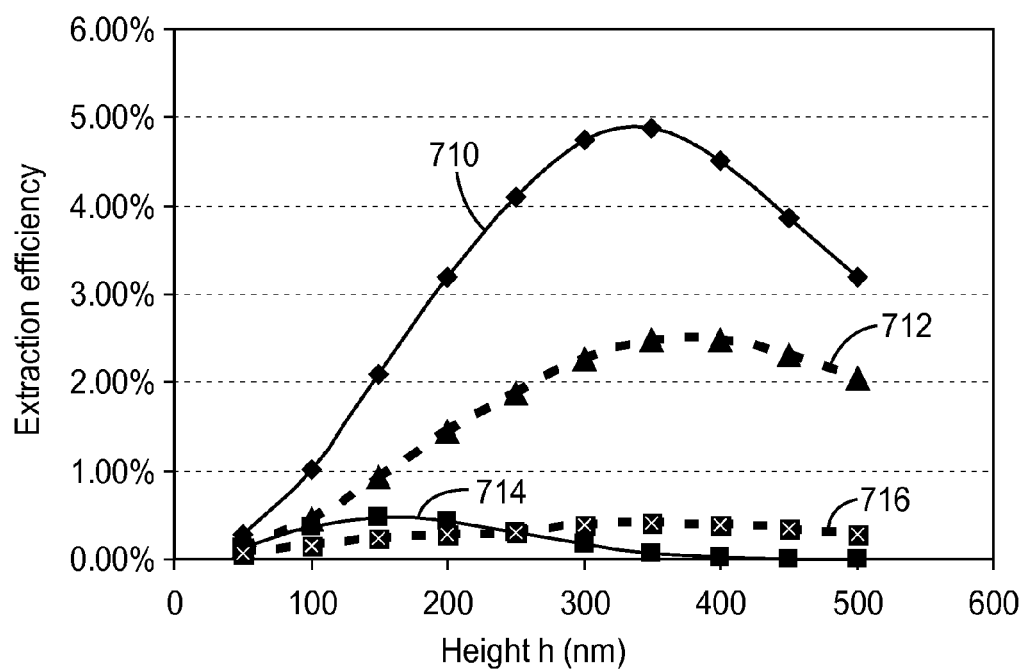
FIG. 7 is a graph of calculated extraction efficiency for the surface structures of FIG. 6.

The calculated quantities are plotted in FIG. 7, where curve 710 is the TM-bottom extraction efficiency, curve 712 is the TE-bottom extraction efficiency, curve 714 is the TM-top extraction efficiency, and curve 716 is the TE-top extraction efficiency. These results demonstrate that guided-mode light can be extracted preferentially through one major surface of the light guide by making the shape of the individual diffractive features (e.g. prisms) asymmetrical. The results also demonstrate that the degree to which light is preferentially extracted from one major surface depends on details of the particular shape of the diffractive features. In the case of right-angle prism features, preferential extraction can be maximized by selecting a height h approximately equal to the pitch p.

The diffractive surface features may be tailored so that light emitted from one major surface of the light guide (e.g. out-coupled light 217a in FIG. 2) is the same as, or similar to, the light emitted from the opposed major surface of the light guide (e.g. out-coupled light 217b in FIG. 2). The light emitted from the opposed surfaces may be the same with respect to color, intensity, and/or the angular distribution of color and/or intensity of the out-coupled light. In one approach, diffractive surface features may be provided on both opposed major surfaces, and these diffractive surface features may be mirror images of each other with respect to a reference plane disposed between and equidistant from the opposed major surfaces, such that the lighting device possesses mirror image symmetry with respect to such a reference plane. In alternative embodiments, the diffractive surface features may be tailored so that light emitted from one major surface of the light guide is substantially different from the light emitted from the opposed major surface of the light guide. The light emitted from the opposed surfaces may be different with respect to color, intensity, and/or the angular distribution of color and/or intensity of the out-coupled light. For example, an observer may perceive that light of one color is emitted from one major surface, and light of a substantially different color is emitted from the opposed major surface. In a horizontally-mounted lighting device, white light sources may be used with suitably tailored diffractive surface features such that white light of a relatively cool color temperature (bluish tint) is directed upwards towards the ceiling, and white light of a relatively warmer color temperature (reddish tint) is directed downwards towards the floor, or vice versa.

In applications where the angular separation of different colors of light due to diffraction is undesirable, several design approaches can be used to overcome the color separation issue. In one approach, shown in FIG. 8, two or more light guides can be stacked together. In another approach, shown in FIG. 9, different diffractive surface features are disposed on opposite major surfaces of a given light guide, and tailored for different colored light sources. In still another approach, shown in FIGS. 10 and 11, the diffractive surface features on a given major surface of a light guide may include groups of surface features of different pitches. Note that although these approaches are presented in connection with dealing with the color separation issue, they may also be used for other purposes including utilitarian and/or aesthetic purposes in which color separation still occurs, or in single-color embodiments that employ only light sources of a given desired (non-white) color. Note also that although the various approaches are described individually, any two or more of the approaches can be combined together and used in a single embodiment.

Figure 8:
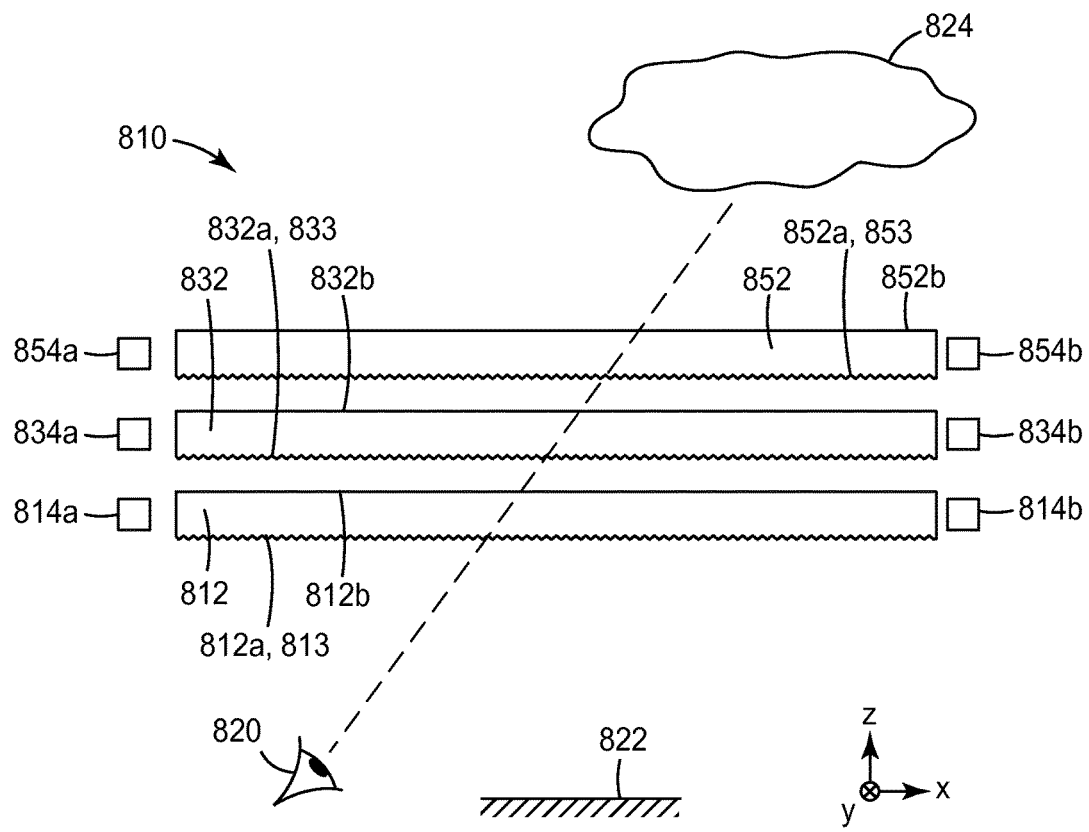
FIG. 8 is a schematic side or sectional view of a lighting device that includes a plurality of light guides in a stacked or layered arrangement.

Turning then to FIG. 8, we see there a schematic view of a lighting device 810 that includes a plurality of light guides 812, 832, 852 in a stacked or layered arrangement. Each light guide has a pair of opposed major surfaces, i.e., light guide 812 has major surfaces 812a, 812b, light guide 832 has major surfaces 832a, 832b, and light guide 852 has major surfaces 852a, 852b. At least one major surface of each light guide preferably includes diffractive surface features, for example, major surface 812a may include diffractive surface features 813, major surface 832a may include diffractive surface features 833, and major surface 852a may include diffractive surface features 853. The device 810 also includes light sources 814a, 814b, 834a, 834b, 854a, 854b arranged as shown to inject light into the respective light guides e.g. through their respective side surfaces, so as to provide guided-mode light in the light guides. Preferably, each of the light guides (including their diffractive surface features) has a low optical distortion such that non-guided-mode light can pass through the light guide relatively undisturbed. In this way, light extracted from the light guide 832 by the diffractive surface features 833 can pass through the light guide 812 to reach a user 820 and/or surface 822, and light extracted from the light guide 852 by the diffractive surface features 853 can pass through both light guide 812 and light guide 832 to reach the user 820 and/or surface 822. Furthermore, the user 820 may also observe objects such as object 824, which may be the same as or similar to object 124 discussed above, through the stack of light guides 812, 832, 852 with little or no optical distortion.

If it is desirable to overcome the color separation issue, the various light guides, light sources, and diffractive surface features in the device 810 may be tailored to provide different colors of out-coupled light to the user 820 and/or surface 822 so that the sum of all such light provides substantially white light illumination. For example, the light sources 854a, 854b may emit red light and the diffractive surface features 853 may optimally extract such light along an optical axis (e.g. an axis parallel to the z-axis) of the device, and the light sources 834a, 834b may emit green light and the diffractive surface features 833 may optimally extract the green light along the same optical axis, and the light sources 814a, 814b may emit blue light and the diffractive surface features 813 may optimally extract the blue light along the same optical axis. Of course, red, green, and blue in the order described are merely examples, and the reader will understand that a multitude of alternative combinations are contemplated. Furthermore, although three light guides are shown in the stack of FIG. 8, other numbers of light guides, including two, four, or more, can also be used. The constituent components of each layer within the stack may all have the same or similar design, e.g., the same light guide dimensions and characteristics, the same dimensions and characteristics of the diffractive surface structures, and the same numbers, colors, and arrangements of LEDs. Alternatively, the constituent components of each layer may differ from corresponding components in other layers in any of these respects. Similar to lighting device 110, the device 810 may provide substantially white light illumination on the surface 822, while providing a colored appearance when the user 820 looks directly at the device 810. Also, the user desirably sees one or more bands having a 3-dimensional appearance in the emitting area of the device 810, which bands may originate with any one, or some, or all of the layers within the stack.

Figure 9:
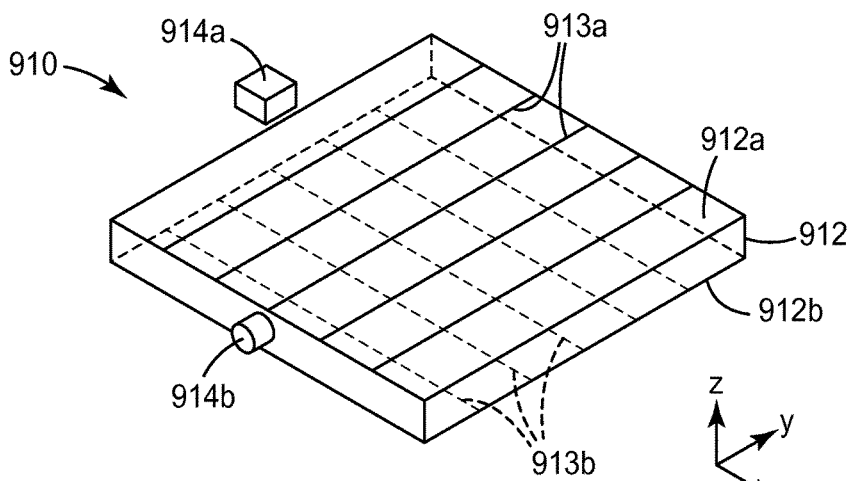
FIG. 9 is a schematic perspective view of a lighting device that includes different diffractive surface features disposed on opposite major surfaces of the light guide and tailored for different colored light sources.

Turning to FIG. 9, we see there a schematic view of a lighting device 910 that includes a light guide 912, and light sources 914a, 914b disposed to inject light into different (e.g. orthogonal) side surfaces of the light guide. The light guide 912 has a pair of opposed major surfaces 912a, 912b. In device 910, each major surface has its own diffractive surface features: surface 912a has diffractive surface features 913a, and surface 912b has diffractive surface features 913b. The diffractive surface features are represented only schematically in the figure, but indicate that features 913a extend generally parallel to one in-plane axis (e.g. the y-axis), and the features 913b extend generally parallel to an orthogonal in-plane axis (e.g. the x-axis). The light sources are likewise positioned and configured to inject light generally along orthogonal in-plane directions, with source 914a disposed to inject light generally along the x-axis and source 914b disposed to inject light generally along the y-axis. The term "generally" is used here because the light sources need not be (and in most cases are preferably not) collimated, but emit light in a distribution of angles in the x-y plane. Also, although the sources 914a, 914b are each shown as a discrete point source such as a single LED emitter, they may alternatively each be a linear array of such discrete sources extending along the respective side surface of the light guide, or a linear or bar-shaped extended source. Nevertheless, light from the source 914a propagates predominantly along the in-plane x-axis, such that it interacts strongly with the diffractive surface features 913a and weakly with the diffractive surface features 913b, and light from the source 914b propagates predominantly along the in-plane y-axis, such that it interacts weakly with the features 913a and strongly with the features 913b.

This selective coupling of the light sources to different respective diffractive surface features on the light guide using geometry or directionality can, if desired, be used to address the color separation issue. For example, the light sources may be substantially complementary in their emission spectra, e.g., source 914a may emit blue light and source 914b may emit yellow light, in which case the diffractive surface features 913a may be configured to extract blue light along a given direction such as an optical axis (e.g. the positive z-axis) of the lighting device 910, while the diffractive surface features 913b may be configured to extract yellow light along the same direction, so as to provide substantially white light illumination along the optical axis. There is little interaction between the blue or yellow light with the diffractive surface features (light extraction grating) of the opposite color because, as explained above, the grooves for blue light extraction extend generally along the light path of the yellow light, the grooves for yellow light extraction extend generally along the light path of the blue light. The different colored light beams are thus guided and extracted independently in the same light guide. The combined visual effect of the out-coupled blue and yellow light gives rise to a sensation of white light to an observer or user. The color rendering index (CRI) of the white light in this example may however be relatively low, because the light guide 912 combines only two colors.

The approach shown in FIG. 9 can be extended to numerous other embodiments, including embodiments that use light sources of other colors, including combinations of different complementary colors, and colors that are not complementary, including also colors that may be the same (e.g. green-emitting light for both sources 914a and 914b, or red-emitting light for both sources). Also, a lighting device such as device 910 can be combined with other lighting devices of similar or different design, e.g. in a stacked arrangement as described in connection with FIG. 8. In such a case, each light guide may be configured to emit a combination of two distinct colors, and the colors collectively emitted from the stack may be selected to produce white light with a higher CRI, if desired.

Another approach that may be used to address the color separation issue is the approach shown generally in FIGS. 10 and 11. In these figures, light guides 1012, 1112 are shown in which the diffractive surface features on a given major surface include groups or packets of surface features of different pitches. The multiple different pitches can be used generally to provide a desired distribution of various wavelengths of extracted light from the light guide, assuming light of such wavelengths is injected into the light guide by one or more light sources (not shown).

As mentioned elsewhere, the light guides disclosed herein may have a variety of different constructions, including a unitary construction, or a layered construction in which two or more components are attached to each other with no significant intervening air gaps. In this regard, the light guides 1012, 1112 are shown to have layered constructions, but they may be readily modified to have a unitary construction if desired. Conversely, light guides shown as being unitary in other figures may be readily modified to have layered constructions. In reference to FIG. 10, the light guide 1012 includes a relatively thick plate or other substrate 1011a, to which is attached a film made up of a carrier film 1011b on which a prism layer 1011c has been cast and cured. The substrate 1011a, carrier film 1011b, and prism layer 1011c preferably have the same or similar index of refraction, and are preferably all highly transmissive to visible light, with little or no scattering or absorption, although in some cases a controlled amount of absorption and/or scattering may be acceptable or even desirable. In reference to FIG. 11, the light guide 1112 may have a similar construction to light guide 1012, and thus may include a relatively thick plate or other substrate 1111a, to which is attached a film made up of a carrier film 1111b on which a prism layer 1111c has been cast and cured.

Attachment of a prismatic or structured surface film to a plate or other substrate to provide a layered light guide can be done by any suitable technique. For example, attachment can be achieved using a suitable adhesive, such as a light-transmissive pressure sensitive adhesive. Attachment may also be achieved using injection molding processes, including insert injection molding processes. Chemical bonds can also be used for attachment, e.g., when a curable resin is cast and cured on a suitable substrate such as a carrier film. Alternatively, in the case of unitary constructions, the diffractive surface features can be formed on at least one surface of a unitary substrate such as a film or plate, e.g. by embossing or molding, including for example injection molding processes. Compression molding, extrusion replication, and direct cutting are additional techniques that may be used to form the diffractive surface features. Regardless of whether the diffractive structures are formed on the surface of a film, plate, or other substrate, the diffractive surface features may be fabricated using any suitable technique now known or later developed. Additional methods that can be used to make suitable diffractive surface features are discussed in one or more of: WO 2011/088161 (Wolk et al.); US 2012/0098421 (Thompson); and US 2012/0099323 (Thompson).

The light guides 1012, 1112 have respective first major surfaces 1012a, 1112a, and respective second major surfaces 1012b, 1112b opposite the first surfaces, as well as side surfaces (not shown). Similar to other light guides described herein, the first major surfaces 1012a, 1112a are configured to have diffractive surface features 1013, 1113, respectively. The surface features may be referred to as grooves or prisms. The grooves/prisms are shown as having an asymmetric 90 degree sawtooth profile in cross section, but other profiles can also be used as desired including other asymmetric profiles and symmetric (e.g. V-shaped) profiles. In plan view the grooves/prisms may follow paths that are straight, curved, or both (e.g. straight in some places and curved in other places). Significantly, the diffractive surface features 1013, 1113 are arranged into groups or packets, the prisms or grooves in any given packet having a uniform pitch but adjacent packets having different pitches. In some cases, the packets can be arranged in patterns that repeat across the surface of the light guide, the smallest repeating group of packets being referred to here as a "set" of packets. For example, light guide 1012 (FIG. 10) has diffractive surface features 1013 which is divided into groove or prism packets 1030, 1031, and 1032, these packets being arranged in a repeating sequence which defines sets 1040. The prisms or grooves in each of packets 1030, 1031, 1032 have a uniform pitch, but the pitch in packet 1030 is less than that in packet 1031, which in turn is less than that in packet 1032. Light guide 1112 (FIG. 11) has diffractive surface features 1113 which is divided into groove or prism packets 1130, 1131, 1132, 1133, 1134, and 1135. These packets may also be arranged in a repeating sequence to define set 1140. The prisms or grooves in each of packets 1130, 1131, 1132, 1133, 1134, and 1135 have a uniform pitch, but the pitch gets progressively larger as one moves from packet 1130 to packet 1135. Note that although different pitches are used in the various packets shown in FIGS. 10 and 11, preferably every one of the pitches is in a range suitable for coupling some visible guided-mode light out of the light guide by principles of diffraction.

The width (in-plane transverse dimension) of the packets and the width of the sets of packets, when the light guide is seen in plan view, may be small enough so that they are visually imperceptible to the ordinary observer. Alternatively, the width of the packets and/or the widths of the sets of packets may be large enough so that they are perceptible as indicia or as an aesthetic pattern to the ordinary observer.

Multiple pitch extraction designs such as those depicted in FIGS. 10 and 11 can be used for color mixing. Generally speaking, at least two different packets, characterized by two different pitches, can be used, but in many cases at least three different packets, characterized by three different pitches p1, p2, p3, are desirable. The choice of the pitch dimension is a function of the refractive index (n) of the light guide, as well as a function of the wavelength of light ($\lambda$) we wish to extract from the light guide with the given packet. In an exemplary case we may select p1=$\lambda$1/n, where $\lambda$1 is in a range from 400 to 600 nm, and p2=$\lambda$2/n, where $\lambda$2 is in a range from 500 to 700 nm, and p3=$\lambda$3/n, where $\lambda$3 is in a range from 600 to 900 nm. In the case of light guides made of acrylic (n$\approx$1.49) or similar materials, these conditions correspond to a pitch p1 in a range from about 268 to 403 nm, p2 in a range from about 336 to 370 nm, and p3 in a range from 403 to 604 nm. Polychromatic light such as white light propagating within the light guide interacts with the multiple pitch packets so that light of different colors is diffracted (out-coupled or extracted from the waveguide) at different angles for each given packet, the extraction angle for any given color also being different for the different packets. As a result, light of the various colors can be mixed or combined to provide illumination with substantial color uniformity, e.g. substantially white light, for users or objects disposed at a suitable distance from the light guide.

In exemplary embodiments, the lighting device may utilize a plurality of light sources having different spectral outputs, and a controller can be used to independently control the different light sources to actively or dynamically control the perceived color of the light emitted by the lighting device. This active control can be used to adjust or otherwise change the color temperature, correlated color temperature, and/or the color rendering index (CRI) of the output light. Assemblies or combinations of red, green, and blue-emitting LEDs (RGB), or red, green, blue, and white-emitting LEDs (RGBW), are of particular benefit for this purpose. Also, light guides that incorporate a multiple pitch extraction design are also of particular benefit. Preferably, the multiple pitch design incorporates at least one packet of diffractive features of a given pitch for each narrow-band emitting light source, e.g., one or more packets whose pitch is tailored for red light, one or more packets whose pitch is tailored for green light, one or more packets whose pitch is tailored for blue light, and so forth. Note that individual narrow band colors are not limited to red, green, and blue, and light sources that emit other non-white colors such as yellow or amber may also be used to expand the color gamut of the disclosed lighting devices.

A design parameter of interest for the multi-pitch grating design, as well as for other disclosed diffractive surface feature designs, is the effective extraction efficiency. Extraction efficiency was discussed above and will not be repeated here. The "effective" extraction efficiency refers to the percentage of specified light extracted from the specified major surface (612a or 612b) upon a single interaction, divided by the amount of such specified light propagating within the light guide immediately before the interaction with the extraction surface. The effective extraction efficiency for diffractive surface features (grooves or prisms) of a given pitch can be evaluated and compared to the effective extraction efficiencies of other pitches. In general with given system parameters, the effective extraction efficiency of a given pitch: is a linear function of (i.e., directly proportional to) the plan-view area coverage of diffractive features having that pitch (e.g., for the smallest pitch in FIG. 10, the sum of the plan-view areas of the three packets 1030 on the surface); and also depends on other factors including the pitch of the diffractive features and the cross-sectional profile shape of the diffractive features (grooves/prisms). In order to obtain substantial color uniformity, it is desirable to ensure that the effective extraction efficiencies for the different pitches are comparable to each other, e.g., the ratio of effective extraction efficiencies for any two distinct pitches preferably lies within the range from about 0.3 to 3.

Figure 5A:
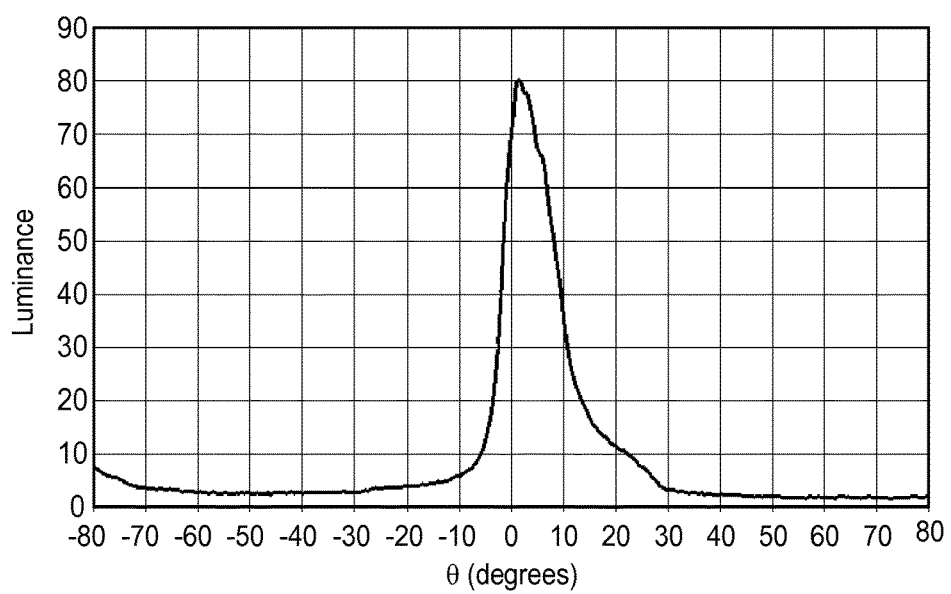
FIG. 5a is a graph of measured luminance versus polar angle along a particular reference plane for the conoscopic plot of FIG. 5.

As we saw in connection with FIGS. 4, 5, and 5a, a monochromatic Lambertian light source used to inject light into a light guide having a single pitch linear diffraction grating gives rise to a crescent-shaped distribution of out-coupled light characterized by a relatively narrow light extraction angle. If even further angular narrowing of the out-coupled light is desired, the light source can be reconfigured with suitable lenses, mirrors, or other components to emit light that is collimated or nearly collimated rather than Lambertian. Conversely, if angular widening of the out-coupled light is desired, the light source can be reconfigured to emit light over a broader angular range than a Lambertian distribution. Microstructured optical films can be combined with light sources such as LEDs or lasers to tailor the angular spread of light injected into the light guide, thereby also affecting the angular spread of the out-coupled light. Suitable microstructured optical films are described in PCT Patent Publications WO 2012/075352 (Thompson et al.) and WO 2012/075384 (Thompson et al.). These optical films, which may be referred to as uniformity tapes, are applied directly to the edge or side surface of a light guide and comprise refractive structures facing outward toward the light source to enhance coupling of light into the light guide. The refractive structures may alternatively be incorporated directly into the side surface or injection edge of the light guide, e.g. by injection molding, embossing, or direct machining Such optical films or refractive structures, when disposed between an LED source and the side surface of a light guide, can broaden the angular spread of light injected into the light guide, and can be used with one, some, or all of the light sources in any of the embodiments disclosed herein. Optical films with custom designed replicated structures can also be used with coherent lasers to provide a well-defined rectangular-shaped angular distribution of light (i.e., a light distribution of approximately constant intensity over a specified cone of angles, and zero or near zero intensity outside the specified cone) for injection into the light guide.

The angular spread of the out-coupled light can also be tailored by appropriate selection of the physical width (in-plane transverse dimension) of the packets of diffractive features, where the physical width is measured orthogonally to the direction of elongation of the prisms/grooves. The physical width of each packet affects all colors of light interacting with the packet, and the overall extracted light is an average effect of all the packets. Physical widths that are small tend to broaden the angular width of the out-coupled light, while physical widths that are large tend to narrow the out-coupled light angular width. However, the amount of angular broadening or narrowing that can be achieved by physical width adjustment is somewhat limited because physical widths that are too small can lead to excessive light spreading such that the diffractive surface features produce a high degree of distortion or scattering, and such that the light guide appears to be diffusive rather than diffractive.

Another technique for producing illumination that is more angularly dispersed (for better spatial uniformity at remote surfaces) is to use a pattern of diffractive surface features oriented along different in-plane directions, e.g., corresponding to different azimuthal angles in the conoscopic plot of FIG. 5. The differently oriented diffractive features are preferably also combined with corresponding light sources that emit light generally along different in-plane directions tailored for maximum extraction efficiency with the corresponding diffractive features. The combination of the variously oriented diffractive features and the variously oriented light sources can produce out-coupled light emitted at a variety of azimuthal directions, resulting in illumination that is more angularly dispersed and more spatially uniform. In an exemplary embodiment, at least three distinct diffractive feature orientations can be used, corresponding to in-plane axes separated from each other by azimuthal angles of 120 degrees.

Differently oriented diffractive features can also be achieved through the use of continuously curved grooves or prisms, e.g., grooves or prisms that are circular, oval, or elliptical in shape (in plan view), or portions of such shapes, e.g., arcs, including series of interconnected arcs such as in sinusoidal or otherwise undulating shapes. In that regard, embodiments disclosed herein that are described as having linear diffractive surface features can alternatively employ diffractive features that are curved. We have found that curved diffractive surface features, when combined with discrete light sources and/or non-uniform reflective structures, can be used to produce visual features in the form of bright or dark bands. Bands such as these are highly undesirable in most extended source applications, but in the present case they are exploited to provide the lighting device with an aesthetic 3-dimensional appearance. The appearance and behavior of these bands will now be discussed further, beginning with FIG. 12a.

Figure 12A:
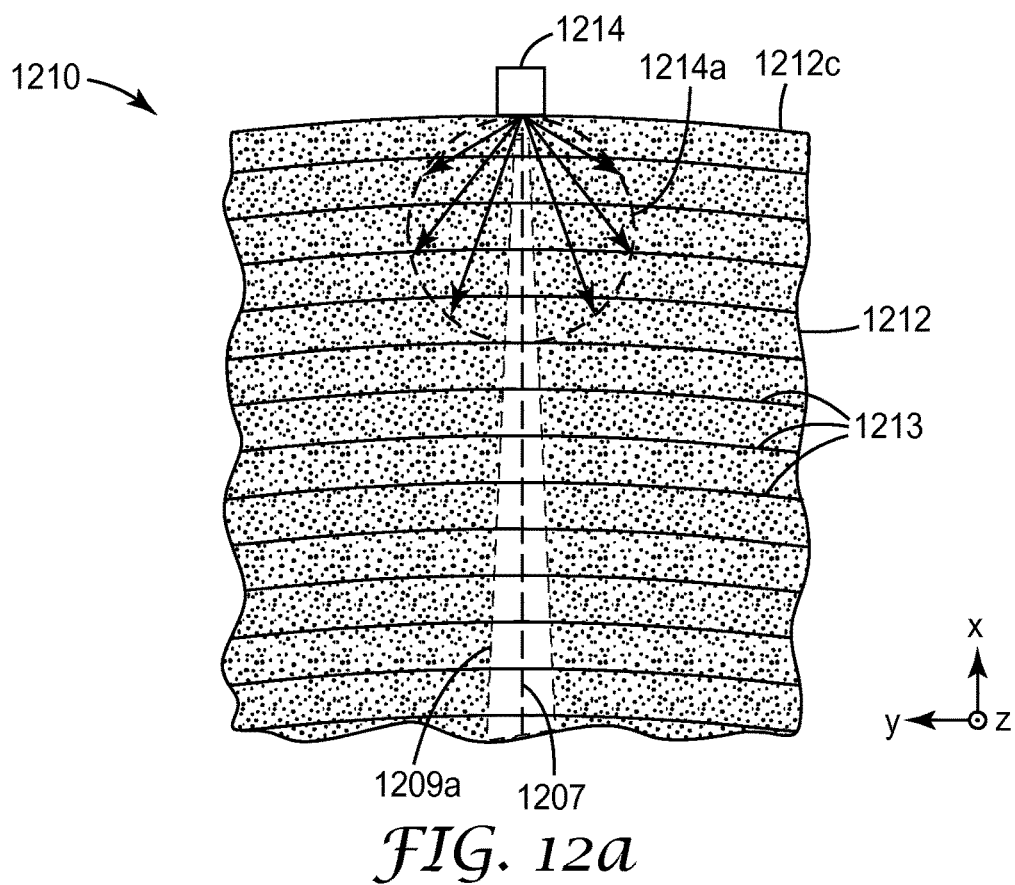
FIG. 12a is a schematic front or plan view of a portion of a lighting device exhibiting a bright band associated with a discrete light source.

FIG. 12a shows schematically a front or plan view of a lighting device 1210 that includes a light guide 1212 and a discrete light source 1214 such as an LED. For simplicity of explanation the light guide 1212 is assumed to lie generally parallel to an x-y plane, but in general the light guide need not be flat or planar as explained elsewhere herein. Also for generality, only a portion of the light guide 1212 is shown in the figure, such that the outer boundary or edge of the light guide 1212 may have any desired shape. However, one edge or side surface 1212c is shown, and the light source 1214 is assumed to be positioned close to the surface 1212c so that light from the light source can be injected into the light guide. The light source 1214 is preferably not collimated in the x-y plane but rather is divergent so that it emits light over a range of angles or directions. In that regard, an in-plane Lambertian emission distribution 1214a is superimposed on the figure, the Lambertian distribution being a representative example of a divergent light source. The distribution 1214a may be interpreted in either of two ways, depending upon design details of the light source: it may represent the intensity distribution of the light source 1214 for light emanating into air or vacuum (i.e., in the absence of the light guide 1212), or it may represent the intensity distribution of the light source 1214 for light actually injected into and propagating within the light guide 1212. The reader will understand that the intensity distribution in air and the intensity distribution in the light guide are not the same in general, but are related to each other by a transformation involving changes in propagation direction due to refraction occurring at the side surface 1212c.

The light guide 1212 includes diffractive surface features 1213 on one or both major surfaces of the light guide, the diffractive surface features being configured to extract guided-mode light from the light guide as explained above. The diffractive features 1213 may be the same as or similar to other diffractive surface features discussed herein, but for purposes of this embodiment we assume the diffractive features are tailored to be curved in plan view as shown. We also assume for simplicity that each individual diffractive feature 1213 has a constant curvature, at least across the portion of the light guide shown in FIG. 12a, and that an imaginary reference line 1207 connects the center of curvature of each diffractive feature 1213 with the light source 1214. Consistent with this description, the diffractive features 1213 may all be concentric, in which case the curvature of the features monotonically decreases (radius of curvature monotonically increases) as one progresses along the line 1207 towards the light source 1214, or the diffractive features 1213 may have an identical shape, in which case the curvature of the features (and the radius of curvature) remains constant as one progresses along the line 1207 towards the light source 1214. In alternative embodiments each individual diffractive feature 1213 need not have a precisely constant curvature, such as in the case where the diffractive features 1213 are part of a continuous spiral groove or prism.

When the light source 1214 is energized, light is coupled into the light guide 1212, and propagates as guided-mode light over a range of angles or directions, both in-plane and out-of-plane, within the light guide. Some of the guided-mode light is extracted at any given location on the light guide by the diffractive surface features 1213. However, when viewed from the perspective of FIG. 12a, i.e., along a viewing axis that is orthogonal to the plane of the light guide, out-coupled light associated with the light source 1214 is most strongly extracted in a relatively straight, narrow band 1209a which coincides with the reference line 1207. The remainder of the light guide 1212 has a relatively darker appearance, which is indicated by shading in FIG. 12a. The band 1209a thus has the appearance of a bright band on a dark background. The relatively narrow width of the band 1209a is not a result of any collimation of the light source 1214, because the light source is divergent, emitting light over a relatively broad range of in-plane angles or directions. The guided-mode light from the light source 1214 is not confined within the plane of the light guide to the region corresponding to the band 1209a, but rather extends beyond that region.

Figure 12B:
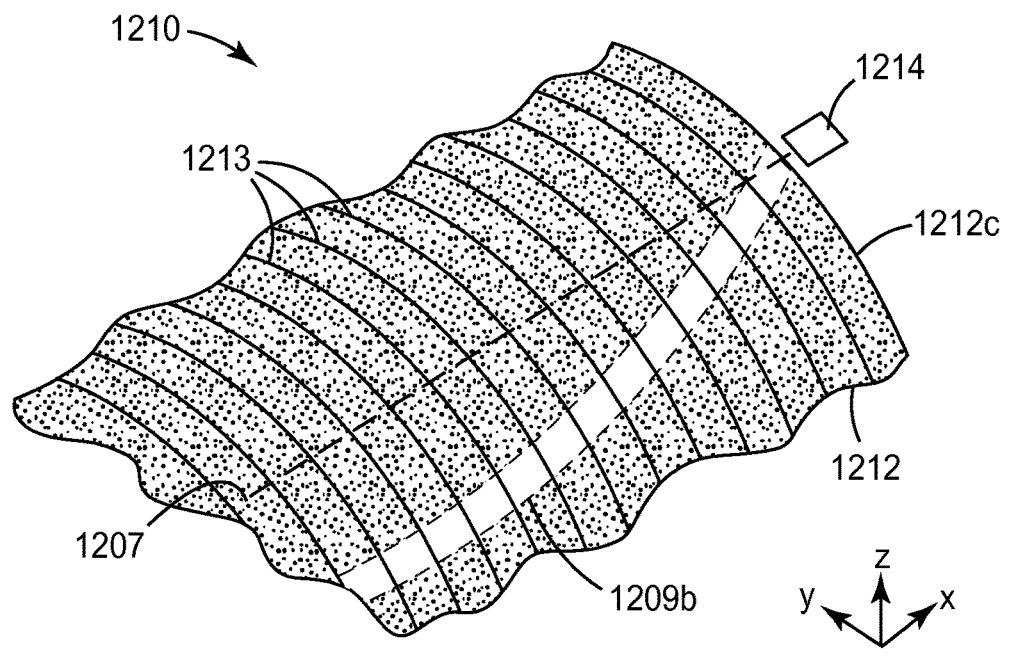
FIG. 12b is a schematic oblique view of the lighting device portion of FIG. 12a, where the device is viewed from an oblique angle, which produces a change in the shape of the bright band.

If we now observe the same lighting device 1210 under the same conditions, except that we change the viewing geometry such that we observe the lighting device 1210 along a different observation direction or axis relative to the x-y-z coordinate system (which we assume to be fixed in relation to the light guide 1212), the bright band appears to shift as shown schematically in FIG. 12b. In particular, the bright band which was originally seen in FIG. 12a as band 1209a coincident with the reference line 1207, changes its shape for the oblique angle viewing geometry to produce a bowed or curved band 1209b which deviates from the reference line 1207 as shown. The band 1209b again has a brighter appearance than the remainder of the light guide, the relatively darker areas being indicated by shading in FIG. 12b.

Figure 12C:
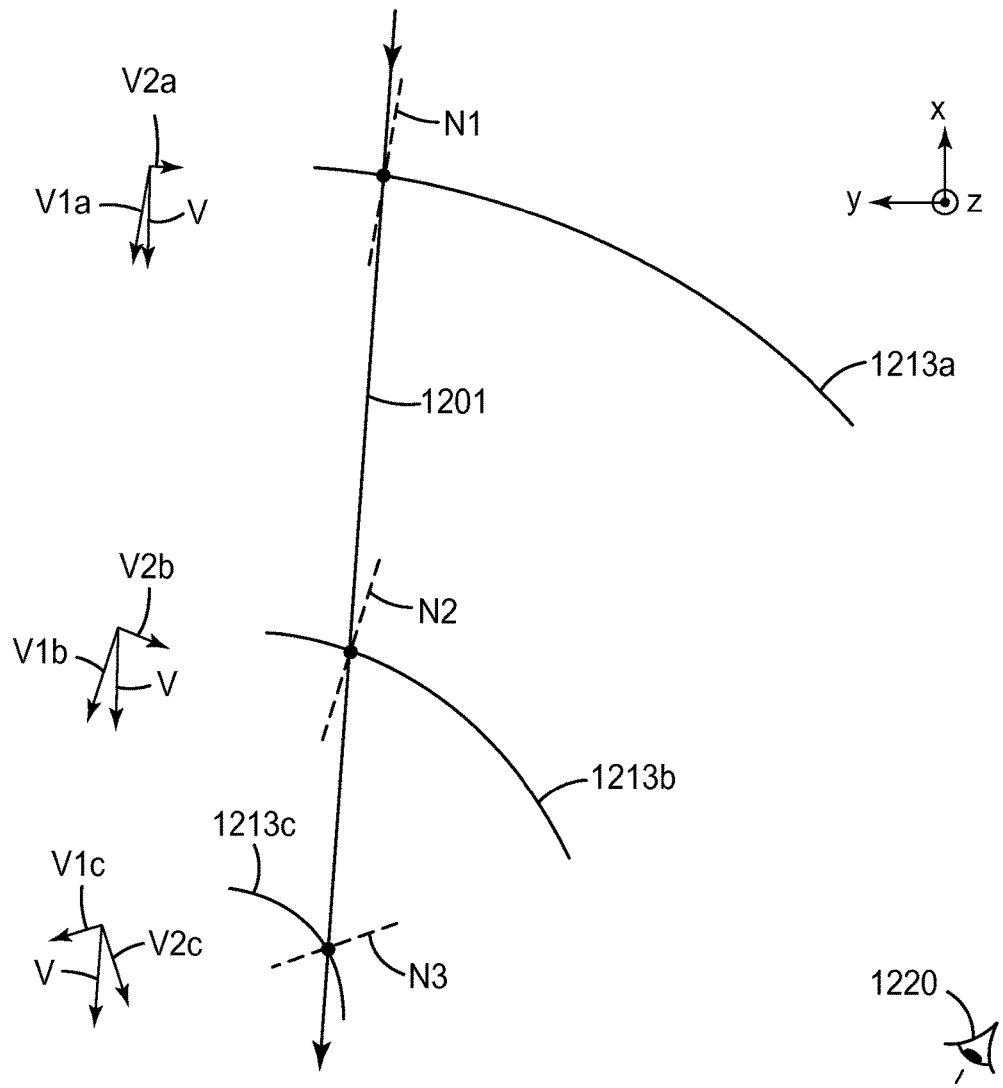
FIG. 12c is a schematic front or plan view of a guided-mode light ray encountering various diffractive surface features.

In FIG. 12c we schematically illustrate some geometrical relationships that may be useful in explaining the observed characteristics of the bright band associated with a discrete light source as depicted in FIGS. 12a and 12b. Thus, we illustrate a front or plan view of a guided-mode light ray 1201 that encounters (intersects) three diffractive surface features 1213a, 1213b, 1213c. For illustrative purposes we assume the surface features are concentric circular arcs, and the light ray 1201 intersects the arcs at different angles of incidence as measured relative to a radial direction at the respective points of intersection. The respective radial directions are labeled as N1 for the first point of intersection, N2 for the second point of intersection, and N3 for the third point of intersection. At the left side of FIG. 12c across from each point of intersection, a vector V is shown representing the propagation direction of the light ray 1201. Also for each point of intersection, the vector V is decomposed into a component parallel to the radial direction (V1a, V1b, V1c) and a component perpendicular to the radial direction (parallel to the tangent direction) (V2a, V2b, V2c).

For any given interaction of the guided-mode light ray 1201 with a diffractive surface feature, the amount of light extracted from the light guide at the point of intersection will depend on a variety of factors, including but not limited to: the groove or prism pitch; the groove or prism cross-sectional profile; the wavelength of light; the in-plane orientation of the light ray, as expressed in terms of the decomposition of the direction vector V of the light ray along the local radial and tangential directions; and the out-of-plane orientation of the light ray. At each point of intersection, typically at least some of the light is extracted, but the amount of extracted light and its directional distribution as a function of polar and azimuthal angle can depend heavily on the listed factors. As the angle between the direction vector V and the radial direction increases, the amount of light extracted tends to decrease because the component of the direction vector tangent to the diffractive surface feature does not interact with the diffractive surface feature.

Figure 12D:
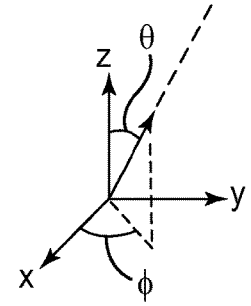
FIG. 12d is a schematic view of an observation direction or vector in the context of a Cartesian coordinate system and a polar coordinate system with polar angle $\theta$ and azimuthal angle $\phi$.

FIG. 12d is provided for reference purposes to illustrate an observer 1220 looking at a lighting device such as device 1210 along a particular observation direction or vector in the context of a Cartesian coordinate system and a polar coordinate system. The light guide of the lighting device, or a portion thereof, is assumed to lie in the x-y plane. The observation or viewing direction (vector) can be specified in terms of the polar angle θ and the azimuthal angle φ. In order for the observer 1220 to observe a bright band extending across the light guide, the region of the light guide corresponding to the bright band must have an angular distribution of emitted or out-coupled light that is substantially more intense in the particular (θ, φ) viewing direction than the angular distributions of out-coupled light for other regions of the light guide. Then, if the observer changes the viewing geometry by moving to a different viewing direction (θ, φ), the bright band shifts in position and shape if a different region of the light guide, corresponding to the shifted band, has an angular distribution of out-coupled light that is substantially more intense in the new (θ, φ) viewing direction than other regions of the light guide. The appearance of the band for any given viewing direction is determined by the angular distribution of out-coupled light at every point on the entire extended output area of the light guide. The changing shape of the band (compare bands 1209a, 1209b) that is observed for curved diffractive surface features may be related to the geometrical factors discussed in connection with FIG. 12c in combination with the crescent-shaped distribution characteristic depicted in FIG. 5, which is a demonstration of the Lambertian input light being extracted to a selective angular range.

Figure 13A:
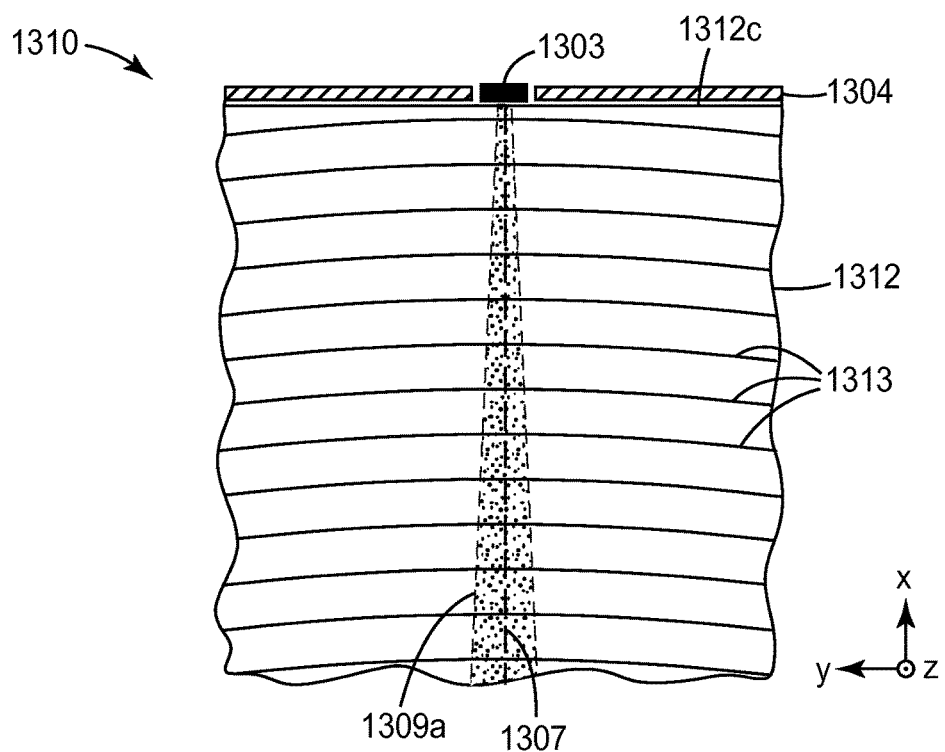
FIG. 13a is a schematic front or plan view of a portion of a lighting device exhibiting a dark band associated with a non-uniform reflective structure.
Figure 13B:
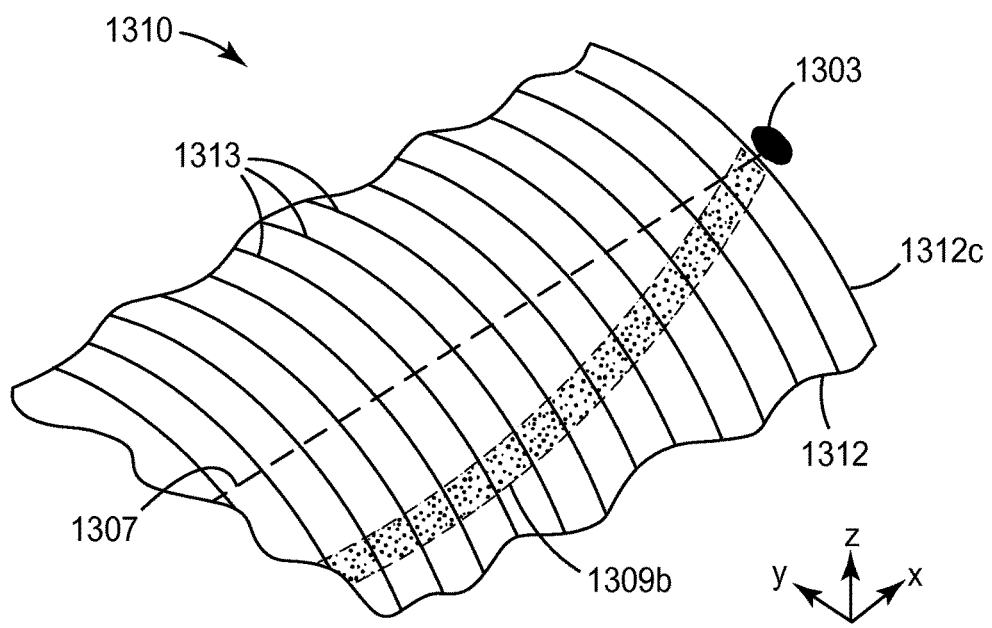
FIG. 13b is a schematic oblique view of the lighting device portion of FIG. 13a, where the device is viewed from an oblique angle, which produces a change in the shape of the dark band.

We have found that the disclosed light guides and diffractive surface features can be used to produce not only bright bands that change in shape with viewing geometry, but also dark bands that change shape in the same or similar ways. Such a dark band is depicted in FIGS. 13a and 13b. One particularly useful way of generating dark bands is with the use of non-uniform reflective structures provided at one or more side surfaces of the light guide.

Thus, in FIG. 13, we see a lighting device 1310 that includes a light guide 1312 and diffractive surface features 1313 that are curved in plan view. For ease of explanation and brevity we assume that the light guide 1312 and diffractive features 1313 are the same as or similar to the light guide 1212 and diffractive features 1213, respectively, of FIG. 12a. One or more light sources are also provided to inject light into the light guide 1312, but such light source(s), which may or may not be small and discrete in design, are not shown in FIG. 13a. Instead, the figure shows a non-uniform reflective structure disposed proximate one edge or side surface 1312c of the light guide 1312. The non-uniform reflective structure is or includes the combination of an extended reflector 1304 and a discrete area or spot 1303 having a lower reflectivity than the neighboring extended reflector 1304.

The reflector 1304 extends along a major portion of the side surface 1312c and provides a relatively high reflectivity, which may be specular or diffuse, along such major portion. The discrete spot 1303 is smaller and more localized at the side surface 1312c. The reflector 1304 preferably has a reflectivity over some or all of the visible light spectrum of at least 50, 60, 70, 80, or 90 percent. Exemplary materials for use as the reflector 1304 include metals such as aluminum or silver, or multilayer optical films that utilize thin film stacks of alternating organic or inorganic material layers, e.g., 3M™ Vikuiti™ Enhanced Specular Reflector Film (ESR). The reflector 1304 may be in the form of a thin flexible film or a bulk object, and may be spaced apart from the side surface 1312c by a thin air gap or applied directly to the side surface 1312c with no air gap.

The discrete spot 1303 disrupts the high reflectivity provided by the reflector 1304 in a relatively small, localized area. The spot 1303 may be disposed at a gap or aperture in the reflector 1304 as shown, or the spot 1303 may be disposed between the reflector and the side surface if the reflector is structurally continuous. The discrete spot 1303 preferably has a reflectivity over some or all of the visible light spectrum that is substantially less than the reflectivity of the reflector 1304, e.g., at least 20, 30, 40, or 50 percent or more less than the reflector. Preferably, the discrete spot 1303 has a reflectivity over some or all of the visible light spectrum that is less than 50, 40, 30, 20, or 10 percent. The discrete spot 1303 may be or comprise any suitable absorptive material, e.g., black paint or any other suitable light-absorbing material. We have also found that the discrete spot 1303 may be an LED light source that is not energized, i.e., that is turned "off". The discrete spot 1303 may be in the form of a thin flexible film or a bulk object, and may be spaced apart from the side surface 1312c by a thin air gap or applied directly to the side surface 1312c with no air gap. In some cases, the discrete spot 1303 may be entirely omitted, e.g. in the case where a gap, hole, or similar discontinuity is provided in the reflector 1304.

FIG. 13a is a schematic front or plan view of the lighting device 1310 when the light source(s) (not shown) injecting light into the light guide 1312 are energized or illuminated. Guided-mode light from such source(s) propagates within the light guide 1312, and some of this light reaches the side surface 1312c and is reflected by the reflector 1304 back into the light guide. But at the discrete spot 1303, by comparison, little or no such light is reflected. The result of the diminished reflection at the spot 1303 is a region of reduced light extraction from the light guide originating at and associated with the spot 1303. The region of reduced light extraction is perceived as a band 1309a which is darker relative to the surrounding regions of the light guide, the darker appearance indicated by shading in FIG. 13a. When viewed from the perspective of FIG. 13a, i.e., along a viewing axis that is orthogonal to the plane of the light guide, the dark band 1309a is relatively straight and narrow, and coincides with a reference line 1307 which is the same as or similar to reference line 1207 in FIG. 12a. The remainder of the light guide 1312 has a relatively brighter appearance.

If we now observe the same lighting device 1310 under the same conditions, except that we change the viewing geometry such that we observe the lighting device 1310 along a different observation direction or axis relative to the x-y-z coordinate system (which we assume to be fixed in relation to the light guide 1312), the dark band appears to shift as shown schematically in FIG. 13b. In particular, the dark band which was originally seen in FIG. 13a as band 1309a coincident with the reference line 1307, changes its shape for the oblique angle viewing geometry to produce a bowed or curved band 1309b which deviates from the reference line 1307 as shown. The band 1309b again has a darker appearance than the remainder of the light guide, the relatively darker areas being indicated by shading in FIG. 13b.

We have described bright bands of variable shape in FIGS. 12a-b and dark bands of variable shape in FIGS. 13a-b. In some cases, bright and dark bands may be used in combination in the same lighting device and light guide. For example, a plurality of discrete light sources such as LEDs may be disposed at different points along the outer periphery of the light guide, and a reflective structure such as a metal ring or holder may serve the dual purpose of holding the light sources in position at side surfaces of the light guide, and provide a high reflectivity surface along a major portion of the side surfaces. By energizing some of the light sources and not energizing others, a bright band can be produced for each of the energized light sources, and a dark band can be produced for each of the non-energized light sources. Alternatively, absorbing material may be substituted for one or more of the non-energized light sources.

In still other alternative embodiments, non-uniform reflective structures can be used to generate bright bands. This can be achieved by reversing the characteristics of the extended reflector and the discrete absorptive spot used to generate a dark band. Thus, for example, in reference to FIG. 13a, the discrete spot 1303 can be modified to have a high reflectivity as described in connection with the reflector 1304, and the extended reflector 1304 may be modified to have a low reflectivity as described in connection with the discrete spot 1303. This reversal of high and low reflectivity causes the band 1309a (and band 1309b in FIG. 13b) to be relatively brighter than, instead of relatively darker than, surrounding regions of the light guide.

Figure 14:
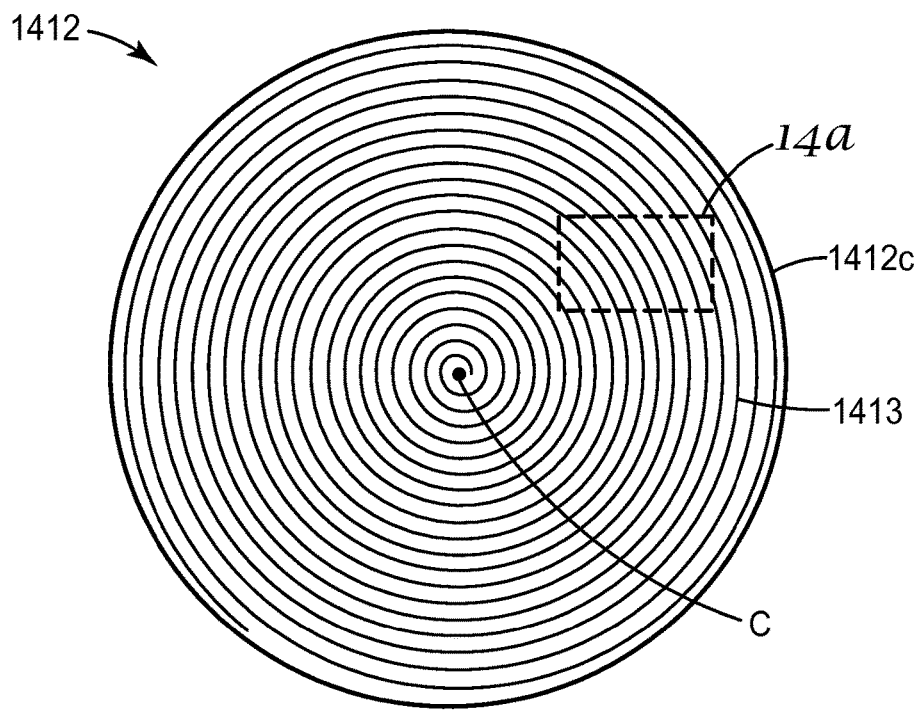
FIG. 14 is a schematic front or plan view of a light guide having diffractive surface structures formed into a spiral.
Figure 14A:
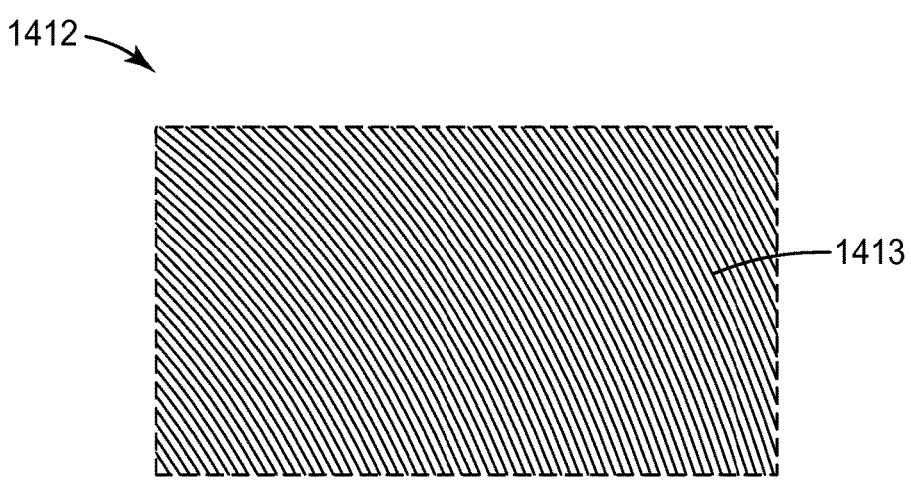
FIG. 14a is a detail of the light guide of FIG. 14.

FIG. 14 shows an exemplary light guide 1412 that can be used as a component in the lighting devices disclosed herein. The light guide 1412 has opposed major surfaces and a side surface 1412c extending continuously around the periphery of the light guide in the form of a narrow circular ring. Diffractive surface features 1413 are provided on one of the major surfaces. In this embodiment, the diffractive features 1413 form a tightly wound spiral, substantially filling one major surface of the light guide. The diffractive features 1413 are thus all curved in plan view over substantially their entire lengths, and the curvature changes monotonically as a function of radial distance from the geometrical center of the light guide 1412 and of the diffractive features 1413, which center is labeled "C" in FIG. 14. A portion of the light guide 1412 and of the diffractive surface features 1413 is shown in a schematic magnified view in FIG. 14a. The pitch of the diffractive features (radial distance between adjacent grooves or prisms) can be uniform or non-uniform, as discussed elsewhere herein. In alternative embodiments, the tightly wound spiral can be replaced with concentric circles or other similar shapes. In other alternative embodiments, the circular shape of the light guide 1412 and the substantially circular shape of the diffractive surface features 1413 can be changed to other curved shapes, such as ellipses or ovals. Furthermore, diffractive surface features may alternatively be provided on both major surfaces of the light guide 1412, or on only a portion of one, or both, major surfaces.

The light guide 1412 may be appropriately sized and combined with suitable discrete light sources to form a luminaire or similar lighting device useful for general illumination purposes in offices, homes, or the like. Such a device is shown schematically in FIG. 15a. In the figure, a lighting device 1510 includes a light guide 1512 having opposed major surfaces and a continuously curved side surface 1512c. Diffractive surface features, not shown, are provided on one of the major surfaces of the light guide 1512. For purposes of this discussion, we presume that the diffractive surface features and the light guide are substantially the same as the diffractive features and light guide of FIGS. 14 and 14a. Thus, the diffractive surface features form a spiral centered at the geometric center "C" of the light guide, and progressing out to the side surface 1512c.

Figure 15A:
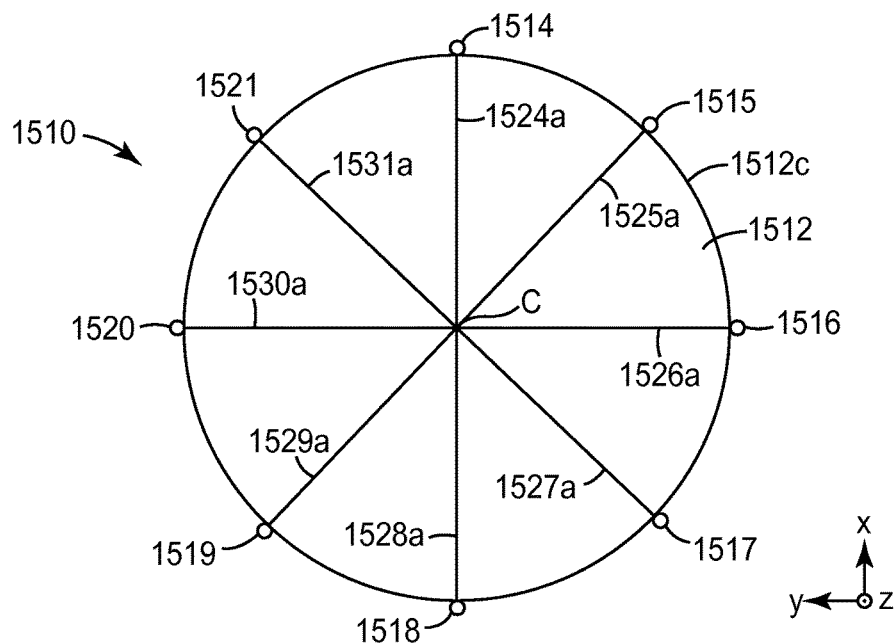
FIG. 15a is a schematic front or plan view of a lighting device utilizing discrete light sources and a light guide having diffractive surface structures that form a spiral or concentric circles.

Eight discrete light sources 1514, 1515, 1516, 1517, 1518, 1519, 1520, and 1521 are equally distributed along the circular side surface 1512c at 45 degree intervals as measured from the center C. Each of the eight light sources, which may be LEDs, is energized and has a divergent light output as discussed above in connection with FIG. 12a. Consistent with that discussion, guided-mode light from each light source interacts with the curved diffractive surface features to produce a bright band from the viewing perspective of FIG. 15a. Thus, source 1514 produces band 1524a, source 1515 produces band 1525a, source 1516 produces band 1526a, source 1517 produces band 1527a, source 1518 produces band 1528a, source 1519 produces band 1529a, source 1520 produces band 1530a, and source 1521 produces band 1531a. The viewing perspective of FIG. 15a is along a viewing axis perpendicular to the plane of the light guide 1512. In that regard, a Cartesian x-y-z coordinate system is assumed to be fixed in relation to the light guide 1512, with the light guide 1512 lying in or parallel to the x-y plane. The viewing axis of FIG. 15a is then parallel to the z-axis. With this viewing geometry, each of the bands 1524a through 1531a has the shape of a straight line segment, all of them radiating outward from the center point C and each terminating at its respective light source.

Figure 15B:
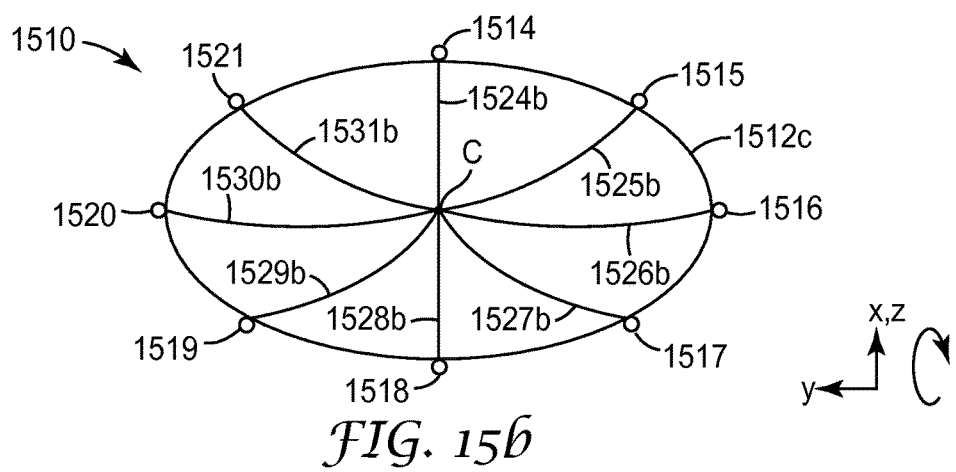

In FIG. 15b, the identical lighting device 1510 is seen from a different viewing geometry. In this figure, elements having the same reference label as in FIG. 15a have already been described, and need not be discussed further. The viewing geometry of FIG. 15b differs from that of FIG. 15a by a rotation about the y-axis such that, in FIG. 15b, the light source 1518 is now disposed closer to the observer than the light source 1514. The viewing axis for FIG. 15b is thus still perpendicular to the y-axis, but at an angle of about 45 degrees relative to the z-axis. For convenience we may refer to the x-z plane as the observation plane, because it includes the viewing axis and the surface normal vector for the light guide 1512.

Comparison of FIG. 15b with FIG. 15a reveals that some of the bright bands have changed shape. Whereas in FIG. 15a all eight bands have the shape of a straight line segment, in FIG. 15b only two of the bands, i.e., bands 1524b and 1528b, have that shape. Note that the endpoints of these two bands (i.e., source 1514 and center point C for band 1524b, and source 1518 and center point C for band 1528b) lie along lines that are parallel to the observation plane. The endpoints of the remaining bands 1525b, 1526b, 1527b, 1529b, 1530b, and 1531b lie along lines that are not parallel to the observation plane but that intersect that plane at non-zero angles, and these bands no longer appear straight but are curved from the viewpoint of FIG. 15b. The eight bands shown in FIG. 15b form a pattern which, due to the relative shapes, positions, and curvatures of the various bands, has a 3-dimensional appearance.

Figure 15C:
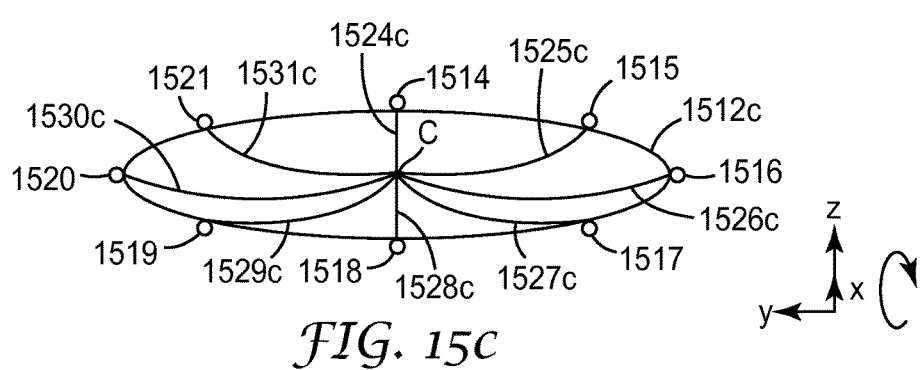
FIG. 15c is a schematic oblique view of the lighting device of FIGS. 15a and 15b, where the device is viewed from an angle that is more oblique than that of FIG. 15b, producing further changes in the shapes of the bands relative to their shapes in FIGS. 15a and 15b.

In FIG. 15c, the identical lighting device 1510 is seen from a yet another viewing geometry. In this figure, elements having the same reference label as in FIGS. 15a and 15b have already been described, and need not be discussed further. The viewing geometry of FIG. 15c differs from that of FIG. 15b by additional rotation about the y-axis such that, in FIG. 15c, the light source 1518 is again disposed closer to the observer than the light source 1514. The viewing axis for FIG. 15c is thus still perpendicular to the y-axis, but at an angle of about 60 degrees relative to the z-axis. The observation plane for the observation geometry of FIG. 15c is therefore still the x-z plane.

Comparison of FIG. 15c with FIG. 15b reveals that some of the bright bands have again changed shape. The two bands having a straight line segment shape in FIG. 15b (see bands 1524b, 1528b) still have such a shape in FIG. 15c (see bands 1524*c*, 1528*c*). Again, the endpoints of these two bands (i.e., source 1514 and center point C for band 1524*c*, and source 1518 and center point C for band 1528*c*) lie along lines that are parallel to the observation plane. The endpoints of the remaining bands 1525*c*, 1526*c*, 1527*c*, 1529*c*, 1530*c*, and 1531*c* lie along lines that are not parallel to the observation plane but that intersect that plane at non-zero angles, and these bands have curvatures that are greater in FIG. 15*c* than their respective curvatures in FIG. 15*b*. The eight bands shown in FIG. 15*c* continue to form a pattern which, due to the relative shapes, positions, and curvatures of the various bands, has a 3-dimensional appearance.

Various features and modifications can be incorporated into the lighting device 1510. For example, more or fewer than eight light sources (including only one) can be used, and if more than two are used they need not be, but may be, equally spaced around the periphery of the light guide. The light sources also need not be, but may be, arranged in pairs on opposite sides of the center point C. If multiple light sources are used, they may all be of the nominally same design, e.g., nominally the same output spectrum (color), output power, and physical dimensions. Alternatively, two or more of multiple light sources may substantially differ in design, e.g., they may have different output spectra (e.g. one may emit red light, another may emit green light, another may emit blue light, another may emit white light, and so forth), or different output powers. In other embodiments, one or more of the light sources may be replaced with an absorptive material, and extended reflector(s) may be provided along the side surface 1512*c*, so that the associated bright band(s) are replaced with dark band(s).

Figure 16:
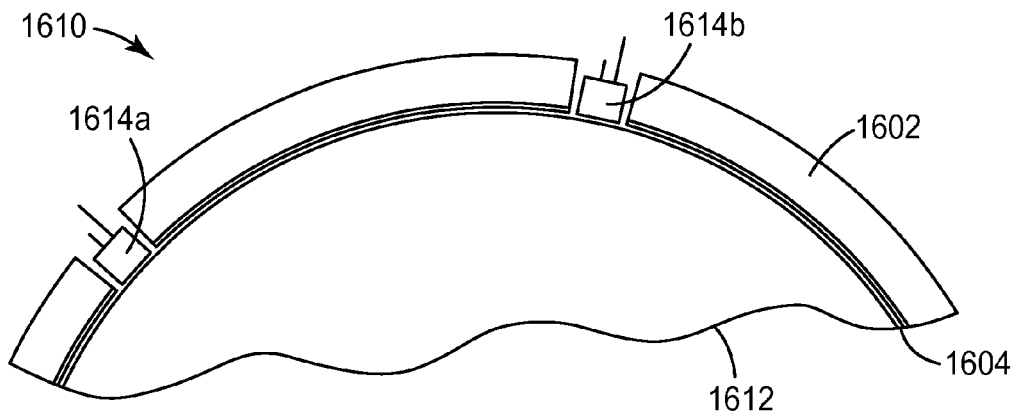
FIG. 16 is a schematic front, plan, or sectional view of a portion of a lighting device including a light guide, discrete light sources disposed to inject light into the light guide, and support structure.

Turning now to FIG. 16, shown there is an exemplary arrangement of how discrete light sources, such as those of FIGS. 15*a-c*, can be mounted along a curved side surface of a light guide. A lighting device 1610 includes a light guide 1612, discrete light sources 1614*a*, 1614*b* disposed to inject light into a curved side surface of the light guide 1612, and support structure 1602 such as a mounting ring. Diffractive surface features, not shown here but described elsewhere herein, are provided on a major surface of the light guide 1612 to extract guided-mode light out of the light guide. The light sources 1614*a*, 1614*b* may be or comprise LEDs or similar small area light sources. The light sources are mounted in apertures or slots of the support structure 1602. If desired, the support structure 1602 can be made of a metal or other reflective material to provide an extended reflector along the side surface of the light guide 1612. Alternatively, a thin reflective film 1604 may be interposed between the support structure and the side surface. In other embodiments, the support structure 1602 can be made of an absorbing (or other low reflectivity) material, and/or the film 1604 can be made to be absorbing or of low reflectivity. The light sources need not be mounted at the side surface of the light guide in order to provide guided-mode light. For example, the light sources may inject light through an outer (e.g. annular) portion of the major surface of the light guide rather than through the side surface, and the side surface may in that case be beveled or angled (e.g. at 45 degrees) so that light from the light source that enters through the major surface is reflected sideways to provide guided-mode light.

Figure 17:
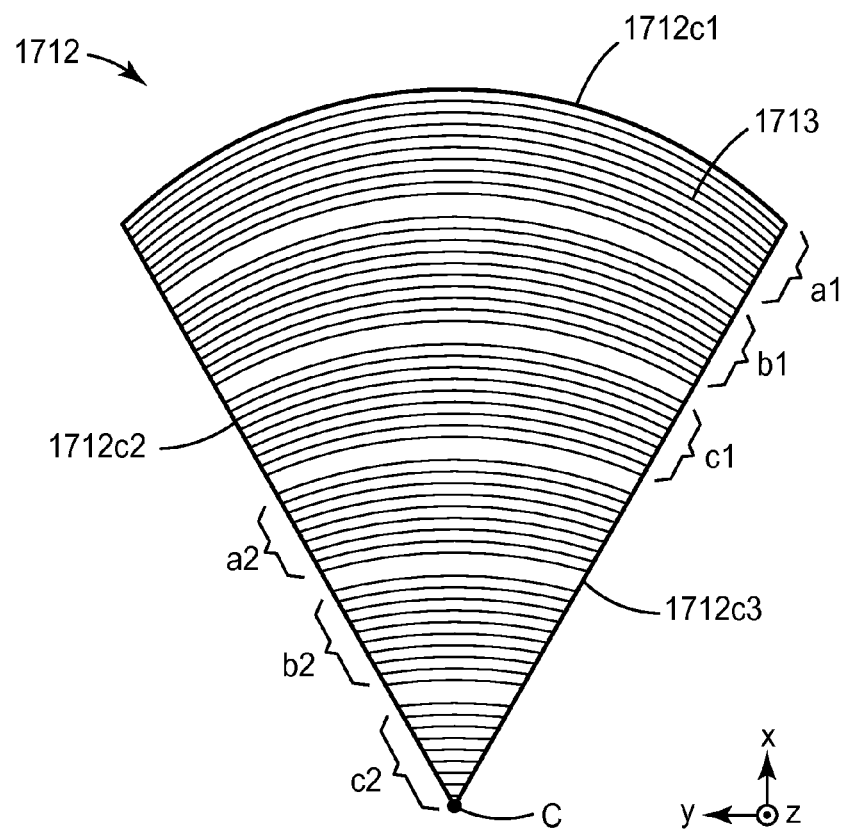
FIG. 17 is a schematic front or plan view of a flat pie-shaped light guide having diffractive surface structures of equal curvature.

FIG. 17 depicts another light guide 1712 that may be used in the disclosed light sources. The light guide 1712 is assumed to be flat, lying in an x-y plane, with opposed major surfaces that are sector-shaped or pie-piece-shaped. Bounding the major surfaces are side surfaces 1712*c*1, 1712*c*2, 1712*c*3. The side surface 1712*c*1 is curved, e.g. like an arc of a circle, and the side surfaces 1712*c*2 and 1712*c*3 are flat. The side surfaces 1712*c*2, 1712*c*3 intersect at a center point C, which may be a center of curvature of the curved side surface 1712*c*1. Diffractive surface features 1713 are provided on one or both major surfaces of the light guide 1712. Rather than being concentric, the diffractive features 1713 are assumed to all have the same curvature, which may be equal to the curvature of the curved side surface 1712*c*1. Furthermore, the diffractive surface features 1713 are arranged into packets of different pitches. These include: packets a1 and a2, having a pitch configured to extract red guided-mode light at a predetermined angle (e.g. orthogonal to the surface of the light guide); packets b1 and b2, having a pitch configured to extract green guided-mode light at the same or different predetermined angle; and packets c1 and c2, having a pitch configured to extract blue guided-mode light at the same or different predetermined angle. The packets are thus arranged into two sets of packets.

The reader will appreciate that numerous modifications can be made to the light guide 1712 in accordance with the other teachings herein. For example, other pitch configurations can be used for the diffractive surface features, including constant pitch over the entire light guide, and other numbers of packet types and/or other numbers of packet sets. Also, the diffractive surface features 1713 may all be made to be concentric, e.g. with a center of curvature at the center point C, rather than a constant curvature.

Figure 18:
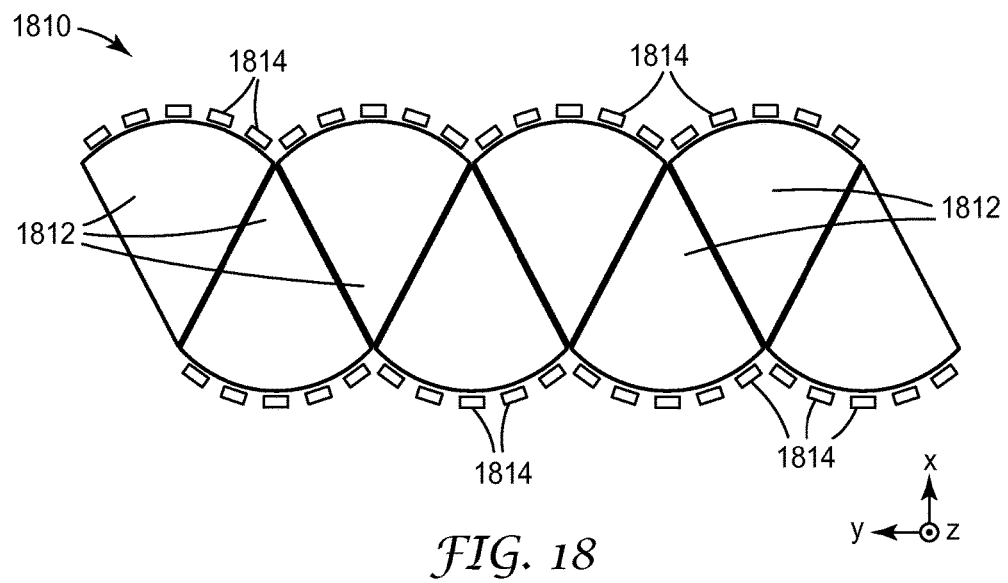
FIG. 18 is a schematic front or plan view of a lighting device that includes a group of flat pie-shaped light guides and discrete light sources.

Light guides such as that of FIG. 17 are suitable for being combined together with light guides of the same or similar design to provide a lighting device with an even larger extended emitting area. Such a lighting device is shown in FIG. 18 as lighting device 1810. The device 1810 includes sector- or pie-shaped light guides 1812 that may be affixed to each other in an alternating tiling arrangement as shown so the resulting group of light guides extends along the y-direction. In this arrangement, straight side surfaces (see e.g. surfaces 1712*c*2, 1712*c*3 in FIG. 17) of adjacent light guides 1812 are affixed to each other. The various light guides 1812 may all have the same nominal design features, e.g. the same pitch configuration of diffractive surface features, or light guides of differing design may instead be used. One, some, or all of the light guides 1812 may be the same as or similar to light guide 1712 of FIG. 17.

The device 1810 also includes a plurality of discrete light sources 1814 distributed along the curved side surfaces of the light guides 1812 to inject light therein. Preferably, one, some, or all of the light sources 1814 interact with diffractive surface features on their respective light guides to produce bands whose shapes changes as a function of viewing angle. The light sources 1814 may all be of the nominally same design, e.g., nominally the same output spectrum (color), output power, and physical dimensions. Alternatively, two or more of multiple light sources may substantially differ in design, e.g., they may have different output spectra (e.g. one may emit red light, another may emit green light, another may emit blue light, another may emit white light, and so forth), or different output powers. If three distinct packet types of diffractive surface features are used for each light guide 1812, e.g. a red, green, and blue packet type as shown in FIG. 17, then the light sources 1814 for each light guide 1812 may comprise or consist essentially of one or more red light source, one or more green light source, and one or more blue light source. In other embodiments, one or more of the light sources 1814 may be replaced with an absorptive material, and extended reflector(s) may be provided along the side surface 1512*c*, so that the associated bright band(s) are replaced with dark band(s).

Example 1

A lighting device suitable for use as a luminaire was made and evaluated. The device was similar in design to that of FIGS. 14, 15*a*, and 16. The device incorporated a circular-shaped light guide with diffractive surface features in the form of a spiral pattern, the diffractive surface features arranged into repeating patterns of six packet types with different groove or prism pitches. A mounting ring was used to position thirty-six equally spaced LEDs around the curved side surface of the light guide to inject light into the light guide. Further details of construction will now be given.

A precision diamond turning machine was used to cut a spiral-shaped groove pattern, which became the diffractive surface features in the lighting device after replication, into the copper surface of a cylindrical tool. The diamond was shaped so that the grooves had a sawtooth (asymmetric) profile in cross section similar to FIG. 6, with a height-to-pitch ratio (see FIG. 6) of about 1:1. During cutting, the groove pitch of the spiral was cycled between six specific values (315 nm, 345 nm, 375 nm, 410 nm, 445 nm, and 485 nm) to produce groove packets which formed nested annular regions that bordered each other but did not overlap with each other. Each annular region was a groove packet of constant pitch, and each set of six adjacent annular regions formed a repeating group or set of groove packets. The spiral pattern had an overall diameter of about 8 inches (about 20 centimeters). The radial dimensions or widths of the annular regions were selected so that the aggregate area for all of the six pitch values was the same. That is, the area of the entire grooved pattern was about 314 cm² ($\pi r^2$, where r≈10 cm), and the aggregate area for grooves having the 315 nm pitch was about 314/6≈52 cm², and the aggregate areas for grooves having each of the other five pitches was also about 52 cm². The annular regions were relatively narrow as measured radially, the maximum such dimension being about 150 micrometers.

The grooved surface of the resulting copper tool was then replicated in a thin flexible light-transmissive film (see e.g. layers 1111*b* and 1111*c* in FIG. 11) using a cast-and-cure technique. This was done by coating the grooved surface of the copper tool with an organic phosphonic acid release layer (commonly known to those skilled in the art), and casting an acrylate resin composition against the coated precision tool using a transparent polyethylene terephthalate (PET) support film having a thickness of about 5 mils (about 125 micrometers). The acrylate resin composition included acrylate monomers (75% by weight PHOTOMER 6210 available from Cognis and 25% by weight 1,6-hexanediol-diacrylate available from Aldrich Chemical Co.) and a photoinitiator (1% by weight Darocur 1173, Ciba Specialty Chemicals). The resin composition was then cured using ultraviolet light. This resulted in a microreplicated optical film about 125 microns thick and having diffractive surface features in the form of a negative or inverted version (negative replica) of the spiral-shaped groove pattern from the precision copper tool. The refractive index of the PET support film was about 1.49 and the refractive index of the cured acrylate resin was about 1.5. The microreplicated optical film had a transparent appearance when viewed at an angle normal to the surface of the film, with a slightly blue hue. Objects could be viewed through the film with low distortion.

Excess material around the spiral pattern was cut away so that the microreplicated film was circular in shape. The film was directly attached to one major surface of a clear, light-transmissive circular acrylic plate of thickness 3 mm, the plate also having a diameter of about 20 cm. Attachment was accomplished using a 1 mil (approximately 25 micrometer) thick optically clear pressure sensitive adhesive (Vikuiti™ OCA 8171 from 3M Company), with the microreplicated surface of the film facing away from the plate and exposed to air, and with substantially no air gaps between the film and the plate. The combination of the plate and the film resulted in a light guide with diffractive surface features on (only) one major surface thereof for light extraction, the light guide having a diameter of about 20 cm and a thickness of about 3 mm.

A string of 36 nominally identical LEDs (product code NCSL119T-H1 from Nichia), each LED emitting white light ("warm white") in a divergent distribution, was used for light injection into the light guide. The LEDs were mounted in a ring-shaped bezel so that they were equally spaced in 10 degree increments around the circular side surface of the light guide, each LED pointed towards the center of the light guide and disposed immediately adjacent the side surface to directly inject light into the light guide. For improved efficiency, strips of high reflectivity mirror film (3M™ Vikuiti™ ESR) were laminated on the inside surface of the mounting ring between every two neighboring LEDs, the mirror film strips also being immediately adjacent to the circular side surface of the light guide.

Figure 19A:
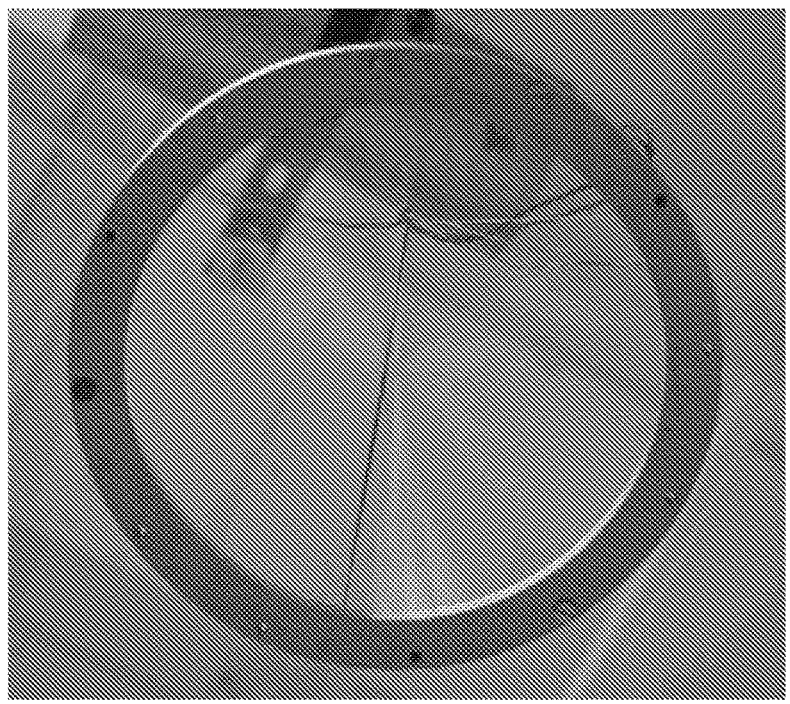
FIG. 19a is a photograph of a lighting device that was constructed using a circular light guide having curved diffractive surface structures, the lighting device photographed from an oblique viewing angle with ambient light on and the discrete light sources of the lighting device turned off.
Figure 19B:
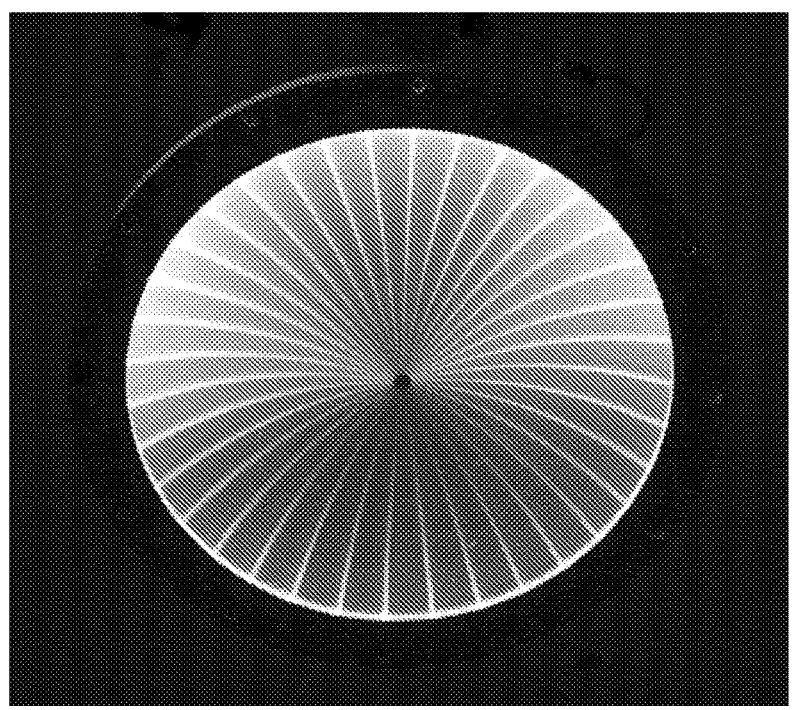

The lighting device so constructed was connected to a power supply and suspended from the ceiling of a room. FIG. 19*a* is a photograph of the lighting device with the power supply turned off and ambient room lights turned on. The viewing direction for this photograph was slightly oblique, i.e., not directly beneath the lighting device along its symmetry or optical axis, but at a moderate angle relative to such axis. Note that details of the ceiling can be seen through the light guide with little or no significant distortion. Wires used to suspend the lighting device and connect it to the power supply can also be seen through the light guide. In this "off" state, the light guide had a slightly bluish hue similar to that of the microreplicated film by itself. FIG. 19*b* is a photograph of the same lighting device from the same viewing direction as FIG. 19*a*, but with the power supply (and thus all 36 LEDs) turned on and the ambient room lights turned off. Variable color hues could be seen at different areas of the light guide, the colors not being visible in the grayscale photograph of FIG. 19*b*. Bright bands could also be seen over the output area of the light guide, one band for each of the 36 energized light sources, and these bands are plainly visible in FIG. 19*b*. Most of the bands are seen to be curved from the viewing geometry of FIG. 19*b*, the bands forming a pattern having a 3-dimensional appearance analogous to FIG. 15*b*. When observed at other viewing directions, the bright bands changed shape substantially analogously to the sequence of FIGS. 15*a* to 15*c*, and variable color hues could be seen across the lightguide at virtually any viewing direction.

Figure 19C:
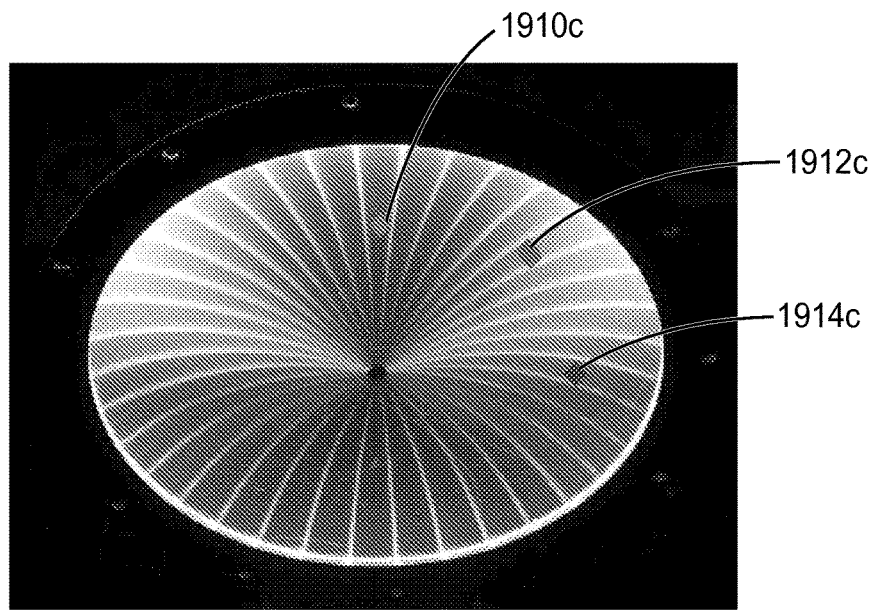
FIG. 19c is a photograph of the lighting device of FIG. 19b at a slightly more oblique viewing angle, and with selected small areas or spots on the surface of the lighting device identified and labeled.
Figure 19D:
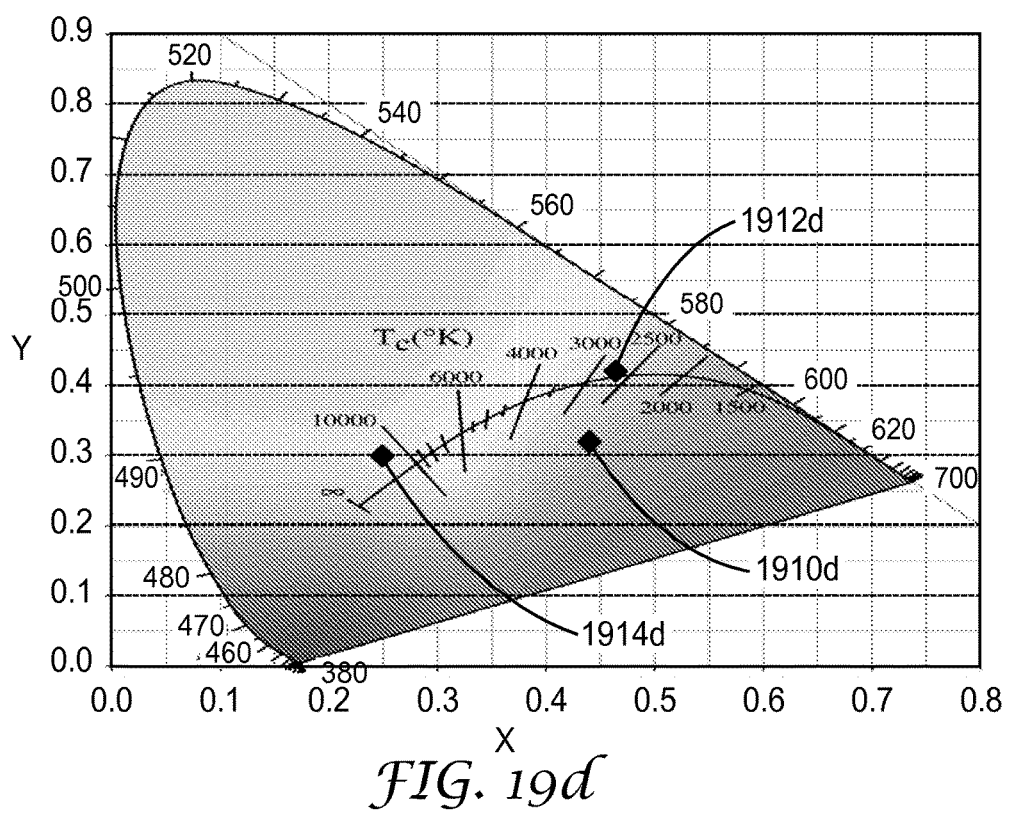
FIG. 19d is a graph of CIE chromaticity coordinates for the selected spots of FIG. 19c.

FIG. 19*c* is another photograph of the lighting device of Example 1 similar to FIG. 19*b*, but at a somewhat more oblique viewing angle. Three small areas or points 1910*c*, 1912*c*, 1914*c* are identified in the photograph on the output area of the light guide between adjacent bright bands. The color at each of these points was measured in terms of the known CIE chromaticity (x,y) coordinates. The CIE (x,y) color coordinates, which are dimensionless, should not be confused with spatial (x,y) coordinates e.g. as in the Cartesian x-y-z coordinate systems shown in various figures herein. The measurement of color was done using a camera configured as a colorimeter, type PR-650 SpectraScan™ from Photo Research Inc., Chatsworth, Calif. Visually, the area 1910c had a dark red color, and is plotted as point 1910d on the CIE color coordinate scale of FIG. 19d. The area 1912c had an orange or brown color, and is plotted as point 1912d on the scale of FIG. 19d. The area 1914c had a blue color, and is plotted as point 1914d on scale of FIG. 19d.

The lighting device of Example 1, with its extended area light guide and diffractive surface features, has the effect of converting the LED light sources, which when viewed directly with the eye appear as very bright point sources, into an extended area source with significantly lower luminance so that the lighting device can be directly viewed without hurting the eyes. The diffractive surface features not only serve the functional purpose of extracting guided-mode light out of the light guide, but also enhance the aesthetic appeal of the lighting device by adding attractive colors and the 3-dimensional band pattern when the lighting device is directly observed (e.g. as in FIGS. 19b and 19c). We have found, however, that the aesthetic colors and bands seen by a user when looking directly at the lighting device need not detract from the ability of the lighting device to provide substantially uniform white light illumination for objects and surfaces remote from the lighting device.

Figure 20A:
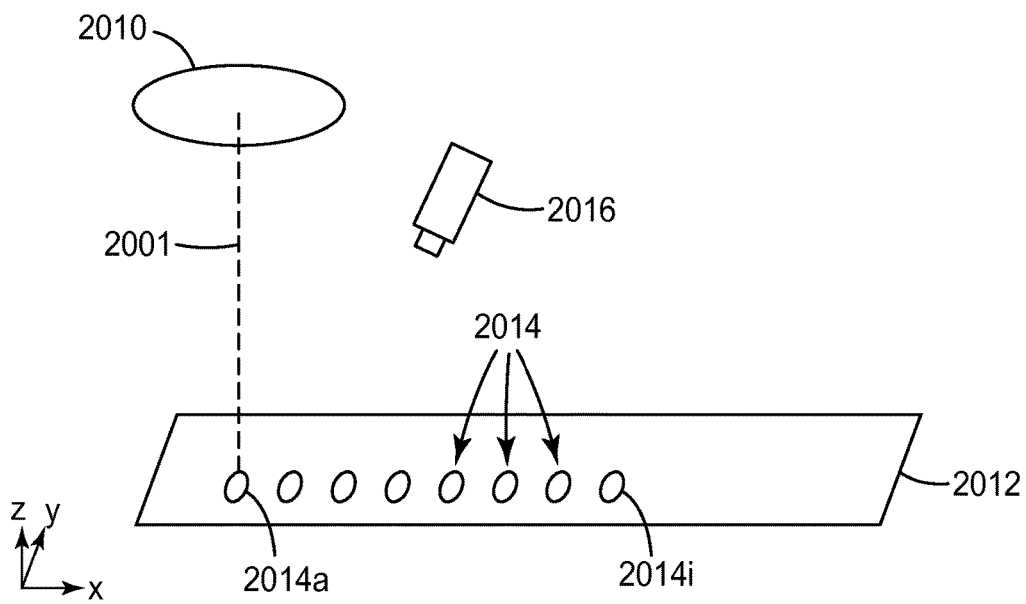
FIG. 20a is a schematic view of a setup used for measuring the optical properties of a surface illuminated by the lighting device of FIG. 19b.

The remote illumination produced by the Example 1 lighting device was tested using the setup shown in FIG. 20a. In this setup, item 2010 represents the Example 1 lighting device, suspended from the ceiling. The lighting device 2010 had an optical axis or symmetry axis 2001 which passed through the center of the disk-shaped light guide and was perpendicular to the light guide. In the figure, the optical axis 2001 is parallel to the z-axis of the Cartesian coordinate system. A flat surface 2012 extended parallel to the x-y plane, and was disposed at a distance of 2.3 meters from the lighting device 2010, as measured along the optical axis 2001. The flat surface 2012 was covered with a white diffusely reflective film (product code DLR80 from E.I. du Pont de Nemours and Company) having a 98% reflectivity for visible light. A camera 2016 was then positioned as shown, oriented at an angle of about 30 degrees relative to the optical axis 2001, to obtain a color image of the white diffuse surface as illuminated solely by the Example 1 lighting device 2010. The PR-650 camera mentioned above was used as the camera 2016. Nine small areas or points were defined on the illuminated flat surface 2012, and the color at each of these small areas was measured using the PR-650 camera. The nine small areas were equally spaced along the x-axis, from a first area 2014a, which was aligned with the optical axis 2001, to a ninth area 2014i, the center-to-center spacing between adjacent areas (collectively referred to with reference number 2014) being 30 centimeters. The distance from the area 2014a to the area 2014i was thus 240 cm. Visually, the illuminated flat surface 2012 appeared nominally white with good spatial uniformity at least over the region covered by the areas 2014.

Figure 20B:
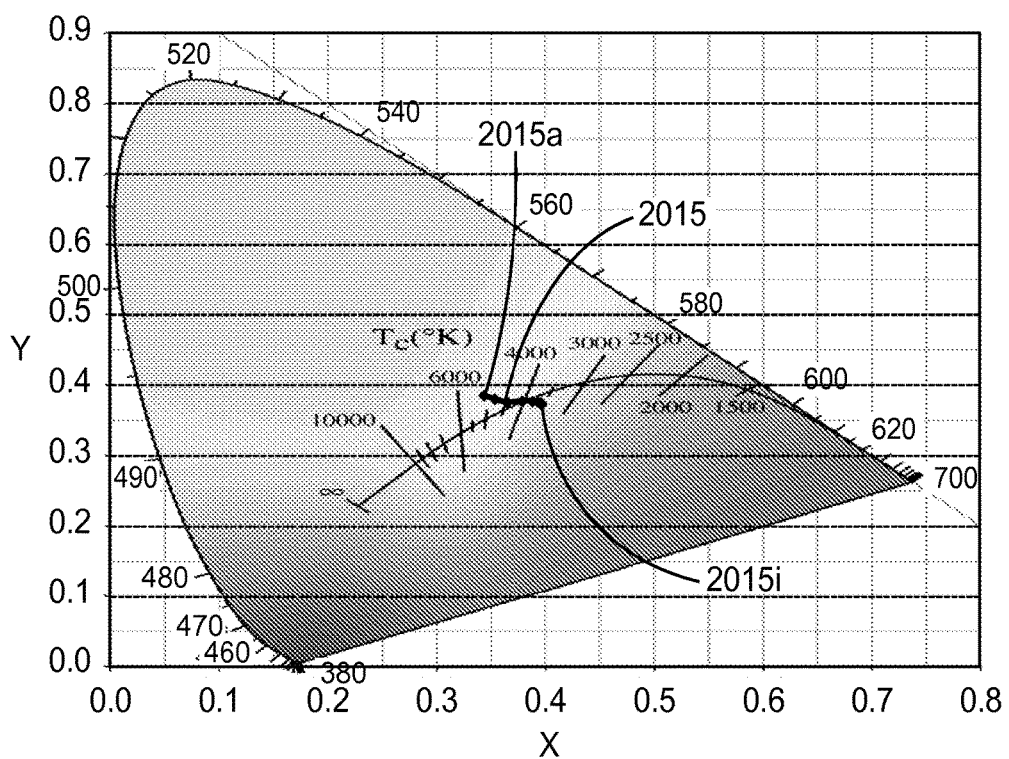

The measured CIE color coordinates for the areas 2014 are plotted on the CIE color coordinate scale of FIG. 20b. The measured colors define a curve 2015, having one endpoint 2015a corresponding to the color at area 2014a, and an opposite endpoint 2015i corresponding to the color at area 2014i. The camera 2016 thus measured a red shift as the sampled area (see areas 2014) moves farther away from the optical axis 2001 of the lighting device 2010. However, the red shift is relatively small, since all of the measured points on the curve 2015 remain close to the Planckian locus, which is indicative of a substantially white field illumination on the surface 2012 from the Example 1 lighting device 2010.

In a variation of the lighting device of Example 1, the power supply was disconnected from selected ones of the 36 white LEDs and the appearance of the lighting device was observed. A faint dark band could be seen for each of the non-energized LEDs, the faint band having generally the same shape as the bright band that would result if the LED was turned on.

Further Examples

A number of lighting devices were made that differed from Example 1 in shape, in size, and in the arrangement of light sources. These lighting devices were made by obtaining a microreplicated optical film as described in Example 1 and cutting it up into rectangular pieces as shown in the plan view of FIG. 21. The rectangular pieces are identified with the labels 2121, 2122, 2123, 2124, 2125, 2126, 2127, 2128, 2129, and are shown superimposed over the spiral pattern of the diffractive surface features. The spiral pattern was described previously in connection with Example 1. Each rectangular piece had a major in-plane dimension (length) of about 6 inches (about 150 mm) and a minor in-plane dimension (width) of about 4 inches (about 100 mm). The cuts were made approximately symmetrically with respect to the spiral pattern, such that the diffractive surface features for piece 2121 were substantially the same as for piece 2129, and the diffractive surface features for piece 2122 were substantially the same as for piece 2128, and the diffractive features for piece 2123 were substantially the same as for piece 2127, and the diffractive features for piece 2124 were substantially the same as for piece 2126. Furthermore, the diffractive surface features for piece 2125 were a portion of the original spiral pattern, with the center of the spiral pattern substantially corresponding to a geometrical center of the piece 2125. Note also that for pieces 2121, 2123, 2127, and 2129, the diffractive surface features occupied most of the area of the rectangle, but no diffractive surface features occupied a triangle-shaped portion of the rectangle, which portion was smooth with no diffractive surface features. For piece 2125, the diffractive surface features occupied most of the area of the rectangle, but no diffractive surface features occupied a small circular-shaped portion in the geometric center of the rectangle, which portion was smooth with no diffractive surface features.

Figure 21:
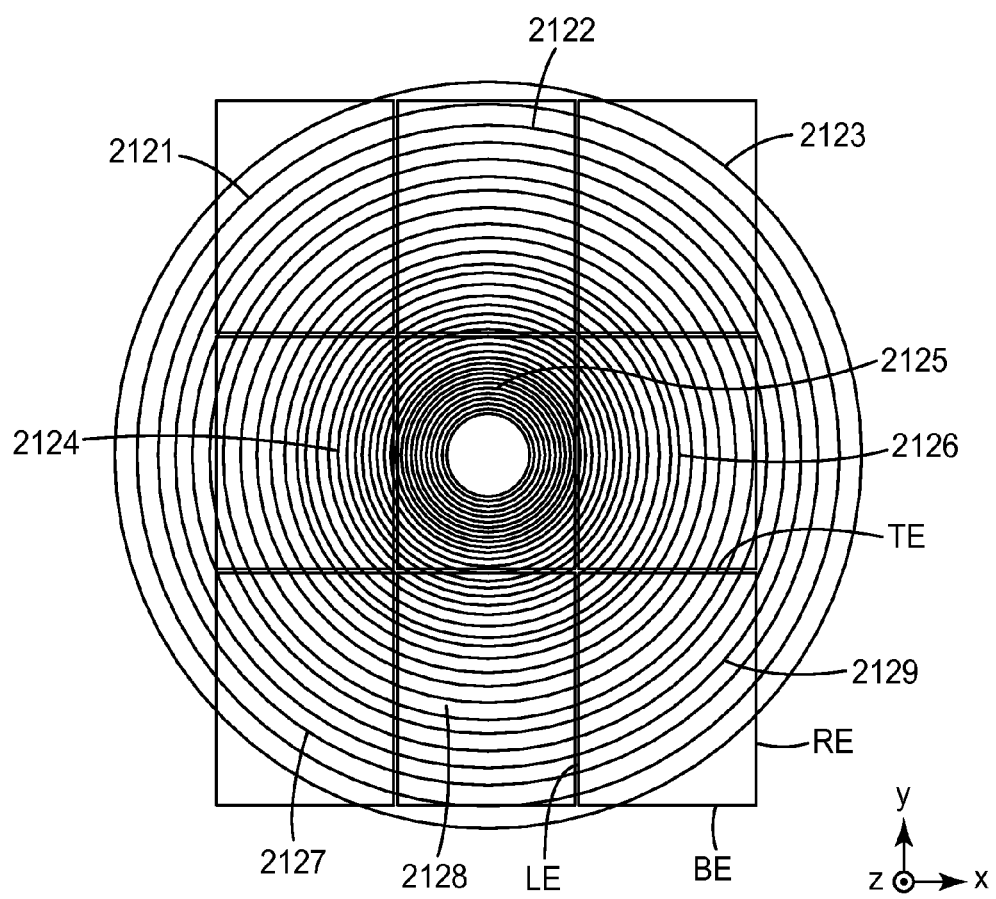
FIG. 21 is a schematic front or plan view of a diffractive film having spiral diffractive surface features, the figure showing how the film was subdivided into rectangular pieces.

For descriptive purposes in the discussion that follows, we refer to the four edges of the rectangular pieces shown in FIG. 21 with the labels "TE" for top edge (from the perspective of FIG. 21), "BE" for bottom edge, "LE" for left edge, and "RE" for right edge. These edges are shown in FIG. 21 for rectangular piece 2129, but are not shown for the other eight rectangular pieces simply to avoid unnecessary clutter in the figure.

Various light guides were then made by adhering a desired one of the rectangular pieces of the microreplicated optical film to a similarly sized and shaped acrylic plate of thickness 3 mm using an optically clear adhesive. Attachment was accomplished so that the microreplicated surface of the film piece faced away from the plate and was exposed to air, with substantially no air gaps between the film piece and the plate. The combination of the plate and the film resulted in a light guide with diffractive surface features on (only) one major surface thereof for light extraction, the light guide having in-plane dimensions of about 6 inches and 4 inches (about 150 mm and 100 mm) and a thickness of about 3 mm.

Such a light guide 2212 is shown schematically in the lighting device 2210 FIG. 22a. This view shows the light guide 2212 is made up of a clear transparent plate 2211a to which is attached a microreplicated optical film piece 2211b. The film piece 2211b may be any one of the rectangular pieces 2121 through 2129 shown in FIG. 21. The light guide 2212 has a first major surface 2212a containing the curved diffractive surface features from the appropriate portion of the spiral pattern. The light guide 2212 also has a second major surface 2212b, which is smooth, unstructured, and opposed to the first major surface 2212a. The light guide 2212 also has opposed side surfaces 2212c, 2212d. A light source module 2214 is mounted adjacent the side surface 2212c to inject light into the light guide 2212.

In FIG. 22a, the major axis of the film piece 2211b, and of the light guide 2212, is assumed to be parallel to the y-axis, for consistency with FIG. 21. The minor axis of the film piece 2211b is thus parallel to the x-axis. A symmetry axis or optical axis 2201 of the light guide 2212 is parallel to the z-axis, and passes through the geometric center of the rectangular-shaped film piece 2211b. A schematic top or plan view of the lighting device 2210 is shown in FIG. 22b. There, one can see that the light source module 2214 has substantially the same length as the short side of the light guide 2212 (and of the rectangular piece 2211b), and includes a row of individual, discrete light sources 2214a equally spaced along the x-axis. In the examples, eighteen such light sources were used, the light sources being nominally identical LEDs (product code NS2W123BT from Nichia), each LED emitting white light in a divergent distribution. The center-to-center spacing of adjacent light sources was about 6 mm. In the view of FIG. 22b, additional side surfaces 2212e and 2212f of the light guide 2212 can also be seen. The optical axis 2201 is disposed at the geometric center of the light guide 2212 and extends parallel to the z-axis.

In some examples, the light source module 2214 was placed adjacent the long edge of the light guide 2212 rather than along the short edge. Such a configuration is shown in the lighting device 2210c of FIG. 22c. The lighting device 2210c is substantially the same as lighting device 2210 except that the light source module 2214 is placed along one of the long edges, such as side surface 2212f, of the light guide 2212. The physical length and number of light sources in the light source module 2214 is the same as in lighting device 2210, thus, the row of light sources 2214 extends along only a portion of the side surface 2212f.

Example 2

Figure 23A:
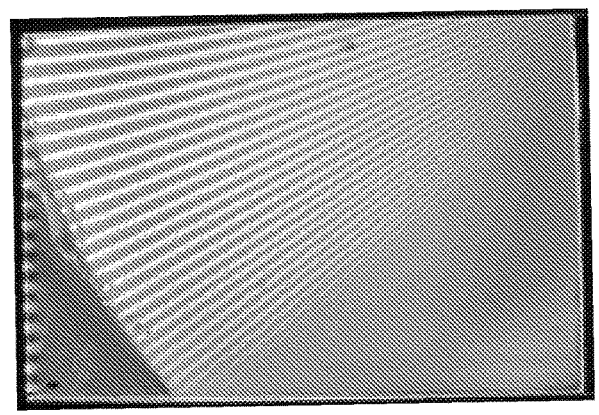
FIGS. 23a-c, 24a-c, 25a-c, 26a-b, and 27a-c are photographs of lighting devices made using rectangular light guides, a linear group of discrete light sources, and diffractive surface features similar to some of those show in FIG. 21.
Figure 23B:
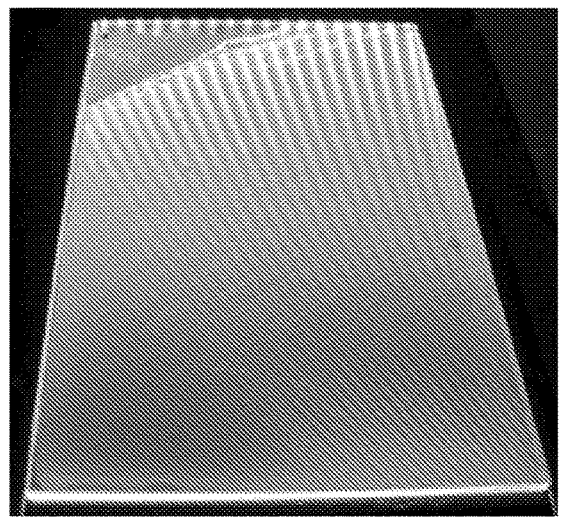
Figure 23C:
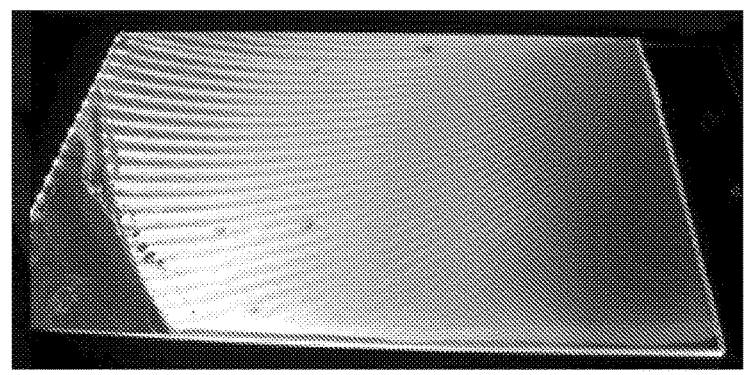

A lighting device was made as described in connection with FIGS. 21 through 22c. The device used rectangular piece 2121 (see FIG. 21), and the light source module 2214 was mounted along the short side of the light guide as shown in FIG. 22b, along the TE edge of the rectangular piece 2121. The light sources were energized with a power supply and photographs were taken of the lighting device from various viewing geometries. A photograph of the lighting device when viewed substantially along the optical axis 2201 (see FIGS. 22a, 22b) is shown in FIG. 23a. The light sources and the TE edge of the piece 2121 are on the left side of this figure. A photograph of the same lighting device when viewed at an oblique angle in the y-z plane is shown in FIG. 23b. The light sources and the TE edge of the piece 2121 are at the top of this figure. A photograph of the same lighting device when viewed at an oblique angle in the x-z plane is shown in FIG. 23c. The light sources and the TE edge of the piece 2121 are on the left side of this figure. Bright bands associated with the discrete light sources can be clearly seen in each of the viewing geometries, and the bands were observed to change in shape and curvature with viewing geometry. Variable color hues could also be seen at different areas of the light guide, but the colors are not visible in the grayscale photograph of the figures.

Example 3

Figure 24A:
Figure 24B:
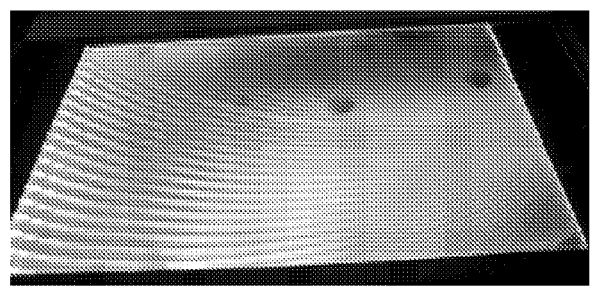
Figure 24C:
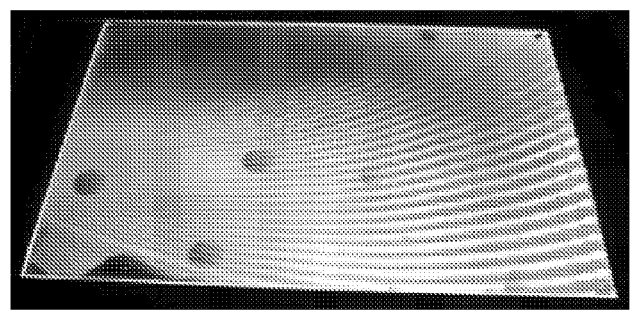

Another lighting device was made as described in connection with FIGS. 21 through 22c. The device used rectangular piece 2122 (see FIG. 21), and the light source module 2214 was mounted along the short side of the light guide as shown in FIG. 22b, along the TE edge of the rectangular piece 2122. The light sources were energized with a power supply and photographs were taken of the lighting device from various viewing geometries. A photograph of the lighting device when viewed substantially along the optical axis 2201 (see FIGS. 22a, 22b) is shown in FIG. 24a. The light sources and the TE edge of the piece 2122 are on the left side of this figure. A photograph of the same lighting device when viewed at an oblique angle in the x-z plane is shown in FIG. 24b. The light sources and the TE edge of the piece 2122 are on the left side of this figure. A photograph of the same lighting device when viewed at another oblique angle in the x-z plane is shown in FIG. 24c. In this figure, the lighting device has been rotated such that the light sources and TE edge of the rectangular piece 2122 are on the right side of the figure. Bright bands associated with the discrete light sources can be clearly seen in each of the viewing geometries, and the bands were observed to change in shape and curvature with viewing geometry. Variable color hues could also be seen at different areas of the light guide, but the colors are not visible in the grayscale photograph of the figures.

Example 4

Figure 25A:
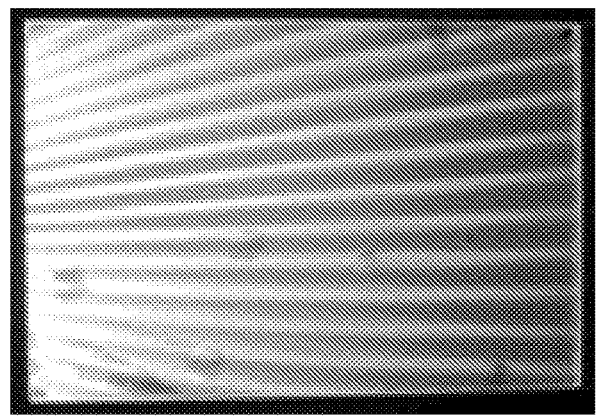
Figure 25B:
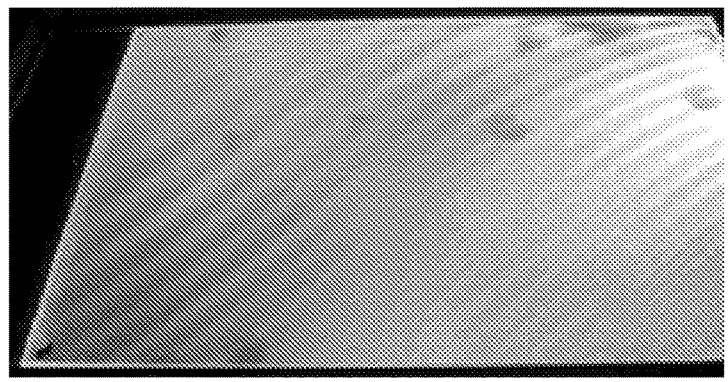
Figure 25C:
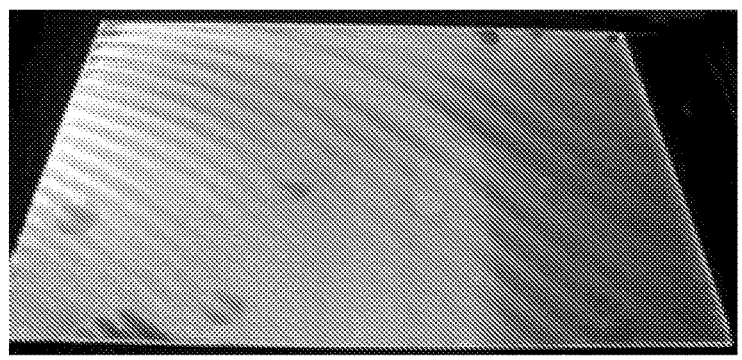

Another lighting device was made as described in connection with FIGS. 21 through 22c. This device was substantially the same as the device of Example 3, except that the light source module 2214 was mounted along the BE edge, rather than the TE edge, of the rectangular piece 2122. The light sources were energized with a power supply and photographs were taken of the lighting device from various viewing geometries. A photograph of the lighting device when viewed substantially along the optical axis 2201 (see FIGS. 22a, 22b) is shown in FIG. 25a. The light sources and the BE edge of the piece 2122 are on the left side of this figure. A photograph of the same lighting device when viewed at an oblique angle in the x-z plane is shown in FIG. 25b. In this figure, the lighting device has been rotated such that the light sources and the BE edge of the piece 2122 are on the right side of this figure. A photograph of the same lighting device when viewed at another oblique angle in the x-z plane is shown in FIG. 25c. In this figure, the lighting device has been rotated back such that the light sources and BE edge of the rectangular piece 2122 are on the left side of the figure. Bright bands associated with the discrete light sources can be clearly seen in each of the viewing geometries, and the bands were observed to change in shape and curvature with viewing geometry. Variable color hues could also be seen at different areas of the light guide, but the colors are not visible in the grayscale photograph of the figures.

Example 5

Figure 26A:
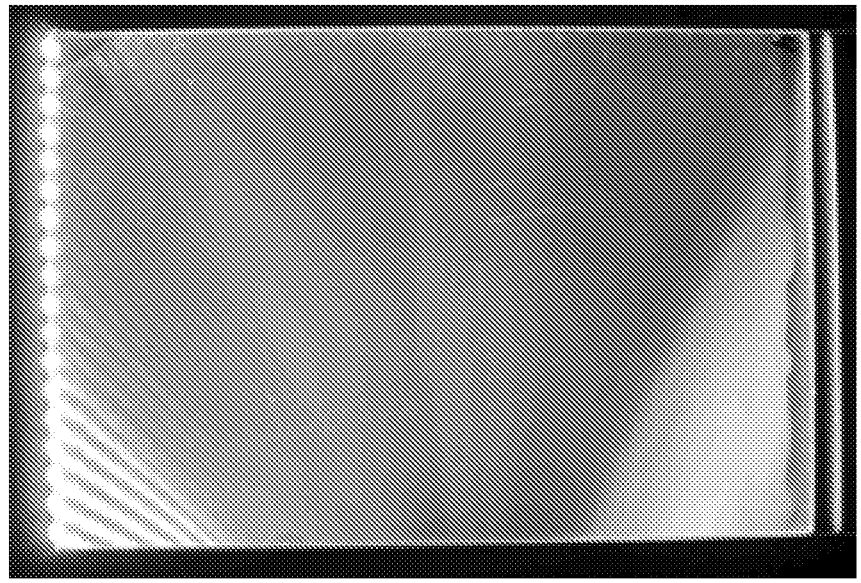
Figure 26B:
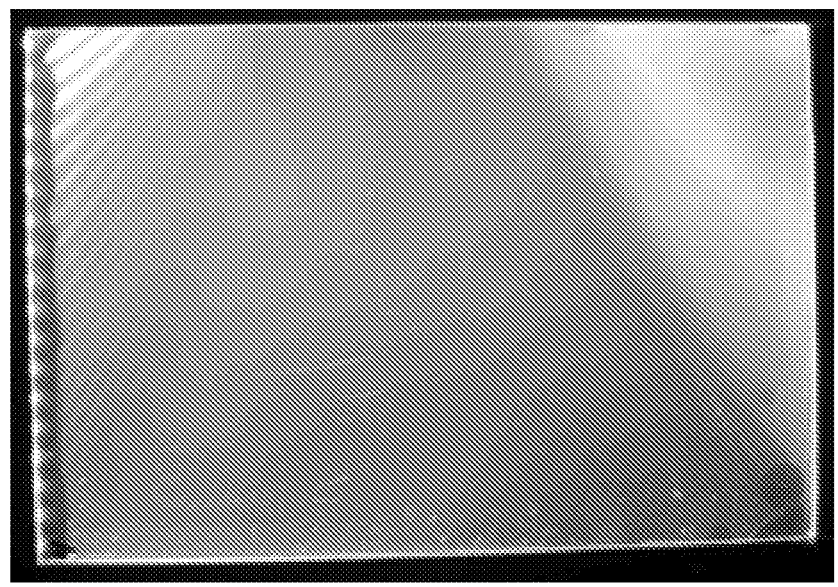

Another lighting device was made as described in connection with FIGS. 21 through 22*c*. The device used rectangular piece 2124 (see FIG. 21), and the light source module 2214 was mounted along the short side of the light guide as shown in FIG. 22*b*, along the BE edge of the rectangular piece 2124. The light sources were energized with a power supply and photographs were taken of the lighting device from various viewing geometries. A photograph of the lighting device when viewed substantially along the optical axis 2201 (see FIGS. 22*a*, 22*b*) is shown in FIG. 26*a*. The light sources and the BE edge of the piece 2124 are on the left side of this figure. A photograph of the same lighting device when viewed substantially along the optical axis 2201 but from an opposite side of the light guide, e.g., facing surface 2212*b* rather than surface 2212*a* in FIG. 22*a*, is shown in FIG. 26*b*. The light sources and the BE edge of the piece 2124 are on the left side of this figure. Bright bands associated with the discrete light sources can be clearly seen in each of the viewing geometries, and the bands were observed to change in shape and curvature with viewing geometry. Variable color hues could also be seen at different areas of the light guide, but the colors are not visible in the grayscale photograph of the figures.

Example 6

Figure 27A:
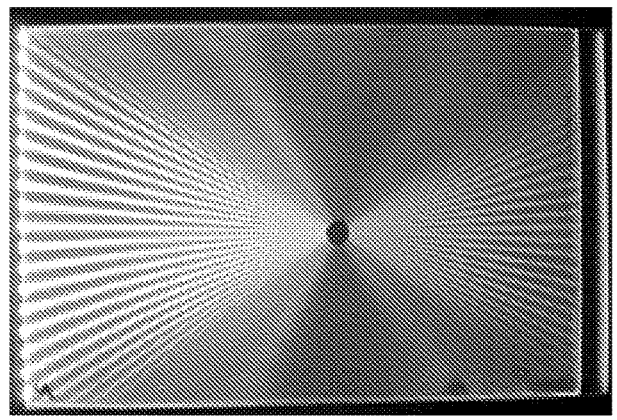
Figure 27B:
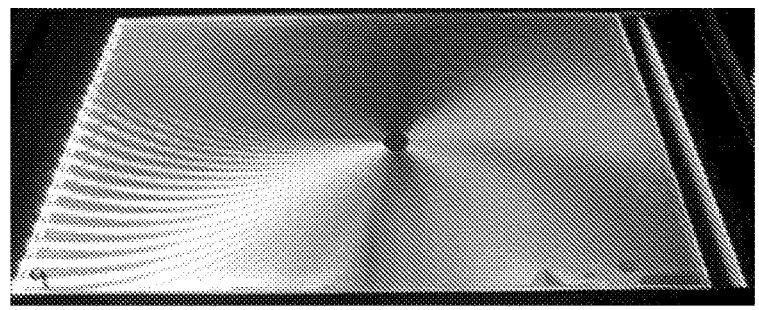
Figure 27C:
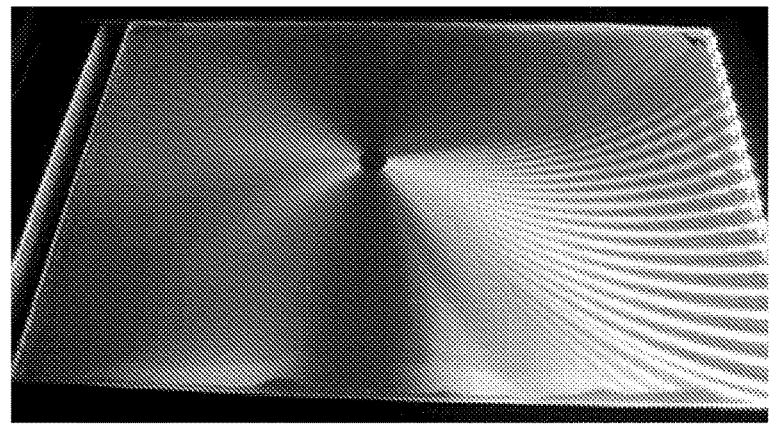

Another lighting device was made as described in connection with FIGS. 21 through 22*c*. The device used rectangular piece 2125 (see FIG. 21), and the light source module 2214 was mounted along the short side of the light guide as shown in FIG. 22*b*, along the TE edge of the rectangular piece 2125. The light sources were energized with a power supply and photographs were taken of the lighting device from various viewing geometries. A photograph of the lighting device when viewed substantially along the optical axis 2201 (see FIGS. 22*a*, 22*b*) is shown in FIG. 27*a*. The light sources and the TE edge of the piece 2125 are on the left side of this figure. A photograph of the same lighting device when viewed at an oblique angle in the x-z plane is shown in FIG. 27*b*. The light sources and the TE edge of the piece 2125 are on the left side of this figure. A photograph of the same lighting device when viewed at another oblique angle in the x-z plane is shown in FIG. 27*c*. In this figure, the lighting device has been rotated such that the light sources and TE edge of the rectangular piece 2125 are on the right side of the figure. Bright bands associated with the discrete light sources can be clearly seen in each of the viewing geometries, and the bands were observed to change in shape and curvature with viewing geometry. Variable color hues could also be seen at different areas of the light guide, but the colors are not visible in the grayscale photograph of the figures.

The teachings of this application can be used in combination with the teachings of any or all of the following commonly assigned applications, which are incorporated herein by reference and filed on even date herewith: U.S. patent application Ser. No. 13/572,813 (published as US 2014/0043850), "Lighting Devices With Patterned Printing of Diffractive Extraction Features"; U.S. patent application Ser. No. 13/572,823 (published as US 2014/0043847), "Colorful Diffractive Luminaires Providing White Light Illumination"; and U.S. patent application Ser. No. 13/372,835 (published as US 2014/0043856), "Diffractive Luminaires".

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A luminaire, comprising:
a light guide having a first major surface, the first major surface having diffractive surface features adapted to couple guided-mode light out of the light guide; and
a discrete light source disposed to inject light into the light guide;
wherein at least some of the diffractive surface features are non-straight in plan view, the at least some of the diffractive surface features including a first diffractive surface feature having a first center of curvature; and
wherein the light source is separated from the first center of curvature such that the light source and the diffractive surface features produce a narrow band that intersects the non-straight diffractive surface features.

2. The luminaire of claim 1, wherein the narrow band is a bright band, and wherein the narrow band changes in appearance as a function of an observer's viewing position relative to the luminaire.

3. The luminaire of claim 2, wherein the narrow band changes from a straight shape at a first viewing position to a curved shape at a second viewing position, and wherein the straight shape coincides with a reference line that connects the first center of curvature with the light source.

4. The luminaire of claim 1, wherein the discrete light source is one of a plurality of light sources disposed to inject light into the light guide, and wherein the narrow band is one of a plurality of narrow bands corresponding to the plurality of light sources, each of the narrow bands intersecting the non-straight diffractive surface features.

5. The luminaire of claim 4, wherein the plurality of narrow bands forms a pattern that changes as a function of an observer's viewing position relative to the luminaire, the pattern of narrow bands having a 3-dimensional appearance for at least some of the viewing positions.

6. The luminaire of claim 5, wherein the light guide is flat.

7. The luminaire of claim 1, wherein, in plan view, the light guide has a non-polygonal shape and a side surface that is curved.

8. The luminaire of claim 7, wherein the discrete light source is disposed to inject light into the light guide through the curved side surface.

9. The luminaire of claim 7, wherein the discrete light source is one of a plurality of light sources disposed to inject light into the light guide through the curved side surface, and wherein the narrow band is one of a plurality of narrow bands corresponding to the plurality of light sources, each of the narrow bands intersecting the non-straight diffractive surface features.

10. The luminaire of claim 7, wherein the non-straight diffractive surface features define curved paths that are substantially non-intersecting and matched to the curved side surface.

11. The luminaire of claim 7, wherein the non-polygonal shape is circular or oval.

12. The luminaire of claim 1, wherein the non-straight diffractive surface features define curved paths that form a spiral or a series of concentric circles or ovals.

13. The luminaire of claim 1, wherein the light guide exhibits low distortion for viewing objects through the light guide.

14. A system, comprising:
a first light guide having a first major surface, the first major surface having first diffractive surface features adapted to couple guided-mode light out of the first light guide; and
a first discrete light source disposed to inject light into the first light guide;
a second light guide having a second major surface, the second major surface having second diffractive surface features adapted to couple guided-mode light out of the second light guide; and
a second discrete light source disposed to inject light into the second light guide;
wherein at least some of the first diffractive surface features are non-straight in plan view, the at least some of the first diffractive surface features including a first diffractive surface feature having a first center of curvature, and the first light source is separated from the first center of curvature such that the first light source and the first diffractive surface features produce a first narrow band that intersects the non-straight first diffractive surface features;
wherein at least some of the second diffractive surface features are non-straight in plan view, the at least some of the second diffractive surface features including a second diffractive surface feature having a second center of curvature, and the second light source is separated from the second center of curvature such that the second light source and the second diffractive surface features produce a second narrow band that intersects the non-straight second diffractive surface features; and
wherein the first and second light guides are in a stacked arrangement, such that the first narrow band is observable through the second light guide.

15. The system of claim 14, wherein the first light source is one of a plurality of first light sources disposed to inject light into the first light guide, and wherein the first narrow band is one of a plurality of first narrow bands corresponding to the plurality of first light sources, each of the first narrow bands intersecting the non-straight first diffractive surface features, and wherein the plurality of first narrow bands forms a first pattern that changes as a function of an observer's viewing position relative to the system, the pattern of first narrow bands having a 3-dimensional appearance for at least some of the viewing positions.

16. The system of claim 15, wherein the first light guide is flat.

* * * * *